US009362828B2

(12) United States Patent
Peker et al.

(10) Patent No.: US 9,362,828 B2
(45) Date of Patent: Jun. 7, 2016

(54) HYSTERETIC CURRENT MODE CONTROL CONVERTER WITH LOW, MEDIUM AND HIGH CURRENT THRESHOLDS

(71) Applicant: Microsemi Corporation, Aliso Viejo, CA (US)

(72) Inventors: Arkadiy Peker, Glen Cove, NY (US); Kevin Mark Smith, Jr., Dana Point, CA (US); Dror Korcharz, Bat Yam (IL)

(73) Assignee: Microsemi Corporation, Aliso Viejo, CA (US)

( * ) Notice: Subject to any disclaimer, the term of this patent is extended or adjusted under 35 U.S.C. 154(b) by 187 days.

(21) Appl. No.: 14/171,843

(22) Filed: Feb. 4, 2014

(65) Prior Publication Data

US 2014/0217996 A1 Aug. 7, 2014

Related U.S. Application Data

(60) Provisional application No. 61/761,251, filed on Feb. 6, 2013.

(51) Int. Cl.
*H02M 3/158* (2006.01)
*G05F 1/10* (2006.01)

(52) U.S. Cl.
CPC ............... *H02M 3/1582* (2013.01); *G05F 1/10* (2013.01)

(58) Field of Classification Search
CPC ... H02M 3/1582; H02M 3/158; H02M 3/155; H02M 3/1588; G05F 1/24; G05F 1/62; G05F 1/10
See application file for complete search history.

(56) References Cited

U.S. PATENT DOCUMENTS

| | | | |
|---|---|---|---|
| 4,494,074 A | 1/1985 | Bose | |
| 5,734,259 A | 3/1998 | Sisson | |
| 6,166,527 A * | 12/2000 | Dwelley | H02M 3/1582 323/222 |
| 2005/0093526 A1* | 5/2005 | Notman | H02M 3/1582 323/282 |
| 2006/0055384 A1* | 3/2006 | Jordan | H02M 3/158 323/282 |
| 2009/0262556 A1* | 10/2009 | Tomiyoshi | H02M 3/1582 363/17 |
| 2011/0037446 A1* | 2/2011 | Engelhardt | H02M 3/1582 323/282 |
| 2011/0089915 A1* | 4/2011 | Qiu | H02M 3/1582 323/271 |
| 2011/0199062 A1* | 8/2011 | Singnurkar | H02M 3/1582 323/282 |
| 2011/0227550 A1* | 9/2011 | Walters | H02M 3/1582 323/283 |

* cited by examiner

*Primary Examiner* — Fred E Finch, III
*Assistant Examiner* — Gustavo Rosario Benitez
(74) *Attorney, Agent, or Firm* — Simon Kahn

(57) ABSTRACT

A converter constituted of: an inductor; a plurality of electronically controlled switches; and a control circuitry arranged to operate in a buck-boost mode responsive to the output voltage of the converter being within a predetermined range of the input voltage of the converter, the control circuitry arranged in the buck-boost mode: responsive to a current flowing through the inductor being lower than a predetermined low current threshold, to control the switches to couple the inductor between the input voltage and a common potential; responsive to the current flowing through the inductor being greater than a predetermined medium current threshold, to control the switches to couple the inductor between the input voltage and the output voltage; and responsive to the current flowing through the inductor being greater than a predetermined high current threshold, to control the switches to couple the inductor between the output voltage and the common potential.

10 Claims, 10 Drawing Sheets

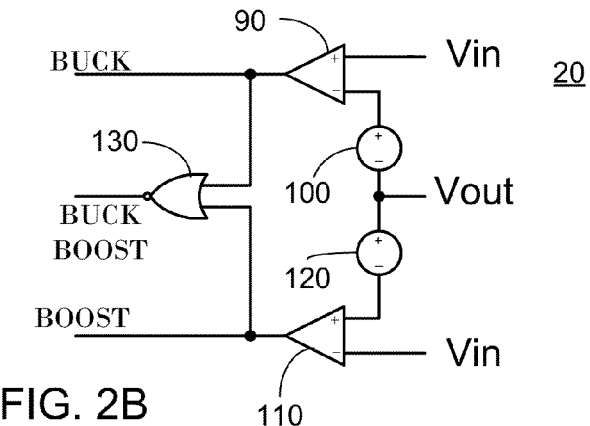
FIG. 2B  PRIOR ART
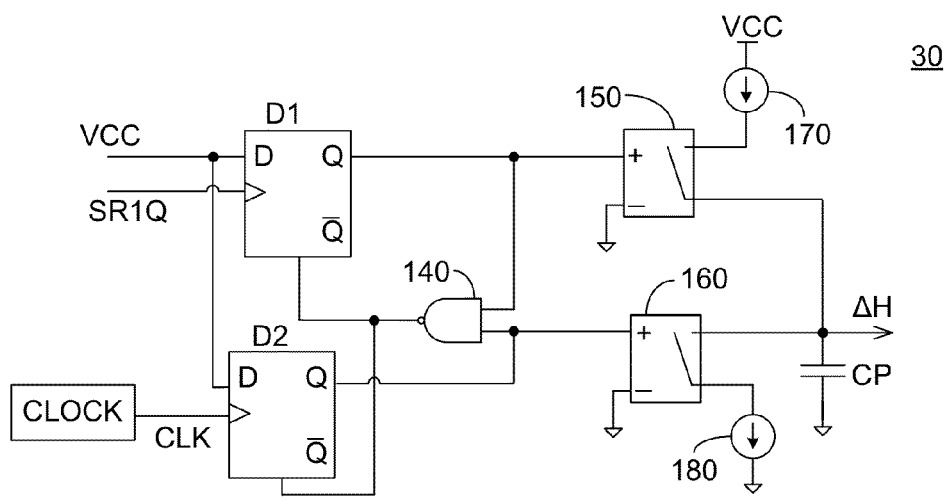
PRIOR ART  FIG. 2C

| 1000 | RESPONSIVE TO VIN BEING WITHIN A PREDETERMINED RANGE OF VOUT, OPERATE CONVERTER IN BUCK-BOOST MODE |
|---|---|
| 1010 | IF INDUCTOR CURRENT < LOW CURRENT THRESHOLD, COUPLE INDUCTOR BETWEEN INPUT AND COMMON POINT, OPTIONALLY: CLOSE FIRST SWITCH COUPLED BETWEEN FIRST END OF INDUCTOR AND INPUT; OPEN SECOND SWITCH COUPLED BETWEEN FIRST END OF INDUCTOR AND COMMON POTENTIAL; CLOSE THIRD SWITCH COUPLED BETWEEN SECOND END OF INDUCTOR AND COMMON POTENTIAL; AND OPEN FOURTH SWITCH COUPLED BETWEEN SECOND END OF INDUCTOR AND OUTPUT, OPTIONALLY LOW CURRENT THRESHOLD A FUNCTION OF GENERATED LOW THRESHOLD VOLTAGE COUPLED TO OUTPUT, OPTIONALLY GENERATE CURRENT RESPONSIVE TO DIFFERENCE BETWEEN VOUT AND VREF AND CHARGE CAPACITOR, THE GENERATED VOLTAGE COUPLED TO CAPACITOR |
| 1020 | IF CURRENT > MEDIUM CURRENT THRESHOLD > LOW CURRENT THRESHOLD, COUPLE INDUCTOR BETWEEN INPUT AND OUTPUT; OPTIONALLY CLOSE FIRST AND FOURTH SWITCH AND OPEN SECOND AND THIRD SWITCH; OPTIONALLY MEDIUM CURRENT THRESHOLD A FUNCTION OF GENERATED MEDIUM THRESHOLD VOLTAGE COUPLED TO OUTPUT; OPTIONALLY COUPLED TO CAPACITOR |
| 1030 | IF CURRENT > HIGH CURRENT THRESHOLD > MEDIUM CURRENT THRESHOLD, COUPLE INDUCTOR BETWEEN OUTPUT AND COMMON POTENTIAL; OPTIONALLY CLOSE SECOND AND FOURTH SWITCH AND OPEN FIRST AND THIRD SWITCH; OPTIONALLY HIGH CURRENT THRESHOLD A FUNCTION OF GENERATED HIGH THRESHOLD VOLTAGE COUPLED TO OUTPUT; OPTIONALLY COUPLED TO CAPACITOR |
| 1040 | (OPT.) ADJUST ONE OF LOW, MEDIUM AND HIGH CURRENT THRESHOLD TO MAINTAIN FIXED SWITCHING FREQUENCY |
| 1050 | (OPT.) IF CURRENT < NON-SWITCHING THRESHOLD, COUPLE INDUCTOR BETWEEN INPUT AND OUTPUT DURING NON- SWITCHING MODE |
| 1060 | (OPT.) IF VIN > VOUT + FIRST VALUE, OPERATE IN BUCK MODE: IF CURRENT < LOW CURRENT THRESHOLD COUPLE INDUCTOR BETWEEN INPUT AND OUTPUT AND IF > HIGH CURRENT THRESHOLD COUPLE INDUCTOR BETWEEN OUTPUT AND COMMON POTENTIAL |
| 1070 | (OPT.) IF VIN < VOUT – SECOND VALUE, OPERATE IN BOOST MODE: IF CURRENT < LOW CURRENT THRESHOLD COUPLE INDUCTOR BETWEEN INPUT AND COMMON POTENTIAL AND IF > HIGH CURRENT THRESHOLD COUPLE BETWEEN INPUT AND OUTPUT |

HYSTERETIC CURRENT MODE CONTROL CONVERTER WITH LOW, MEDIUM AND HIGH CURRENT THRESHOLDS

TECHNICAL FIELD

The invention relates generally to the field of hysteretic current mode control of DC/DC converter.

BACKGROUND

Presently the most popular methods of control for DC/DC converters are voltage mode control and current mode control. Such controls may be used with hysteretic converters, and a current mode control for hysteretic converter is described=in U.S. Pat. No. 4,494,074 to Bose, granted Jan. 15, 1985 and entitled "FEEDBACK CONTROL", the entire contents of which are incorporated herein by reference. Despite this description, hysteretic current mode control remains an obscure technique that few designers use, yet offers advantages in some applications. Hysteretic current mode control (HCMC) offers the tightest and most accurate control of inductor current, and offers excellent transient response to step loads. The advantages of this control technique include: inherent load current limiting; no slope compensation required for duty cycles above 50%; easy loop stability design; and no sub-harmonic oscillation. Additionally, HCMC controls both the average load current and the output voltage.

In spite of these advantages, no straightforward design or analysis of HCMC is available which makes it more difficult to use this mode of control. There are two groups of methods typically utilized to control the switching frequency of HCMC: open loop and closed loop. Open loop methods are easier to implement, however in open loop methods the switching frequency depends upon the power stage circuit topology and components, the input and output voltages and the load. The most precise closed loop frequency control method is to phase lock the converter to a fixed frequency clock. U.S. Pat. No. 5,734,259 to Sisson et al., granted Mar. 31, 1998 and entitled "BALANCED DELTA CURRENT METHOD FOR CURRENT CONTROL IN A HYSTERETIC POWER SUPPLY", the entire contents of which is incorporated herein by reference, is addressed to a method of using hysteretic current mode control in buck converters. In order to keep the frequency fixed, linear feedback is provided from the input voltage to control the hysteresis window vs. input voltage. However, this method does not provide accurate control since the resultant switching frequency is not ultimately linearly related to the input voltage. In particular the relationship of Sisson's converter is derivable mathematically, as shown in EQ. 1 below, to be:

$$\text{Fsw\_buck} = \frac{Vout \cdot (Vin - Vout)}{Ih \cdot L \cdot Vin} = \frac{1}{Ih \cdot L} \cdot Vout \cdot \left(1 - \frac{Vout}{Vin}\right) \quad \text{EQ. 1}$$

where Fsw_buck is the switching frequency of the converter in buck mode, Vout is the output voltage of the converter, Vin is the input voltage of the converter, Ih is the inductor current of the converter and L is the inductance of the inductor of the converter.

In battery application devices it is necessary for the DC/DC converter to operate in a buck mode, buck-boost mode and a boost mode. FIG. 1 illustrates the different stages of such a converter where the x-axis represents time and the y-axis represents voltage. Curve 1 illustrates the battery voltage, denoted VBATT, which is the input voltage of the converter. During time period T1, VBATT is greater than the load voltage, denoted VLOAD and illustrated by line 2, therefore the converter operates in a buck mode. During time period T2, VBATT is close to VLOAD therefore the converter operates in a buck-boost mode. During time period T3, VBATT is less than VLOAD therefore the converter operates in a buck-boost mode.

FIGS. 2A-2C illustrate a high level schematic diagram of a hysteretic current mode control converter according to the prior art. In particular, FIG. 2A illustrates a high level schematic diagram of a hysteretic current mode control converter 10, FIG. 2B illustrates a mode control circuitry 20 arranged to control the mode of converter 10 and FIG. 2C illustrates a phased lock loop (PLL) 30 arranged to adjust the hysteresis levels of converter 10, the figures being described together. Converter 10 comprises: mode control circuitry 20; PLL 30; an input capacitor CIN; a first NMOSFET M1; a second NMOSFET M2; a third NMOSFET M3; a fourth NMOSFET M4; an inductor L1; a sense resistor RS; an output capacitor COUT; an output voltage error circuitry 40; a low threshold voltage source 50; a high threshold voltage source 60; a control circuitry 70; a current sense amplifier CSA; and an external clock 80. Mode control circuitry 20 comprises: a buck mode comparator 90; a buck mode voltage source 100; a boost mode comparator 110; a boost mode voltage source 120; and a buck-boost NOR gate 130. PLL 30 comprises: a first PLL D flip flop D1; a second PLL D flip flop D2; a PLL NAND gate 140; a first PLL electronically controlled switch 150; a second PLL electronically controlled switch 160; a first PLL current source 170; a second PLL current source 180; and a PLL capacitor CP. Output voltage error circuitry 40 comprises: a voltage divider 190; a transconductance amplifier TCA; a TCA reference voltage source 200; an error circuitry resistor RE; and an error circuitry capacitor CE. Control circuitry 70 comprises: a switching control unit 210; a high threshold comparator 220; a low threshold comparator 230; and a control SR flip flop SR1.

A first end of input capacitor CIN is coupled to the input of converter 10 and to the drain of first NMOSFET M1 and a second end of input capacitor CIN is coupled to a common potential. The voltage at the input of converter 10 is denoted Vin. The source of first NMOSFET M1 is coupled to a first end of inductor L1 and to the drain of second NMOSFET M2 and the source of second NMOSFET M2 is coupled to the common potential. A second end of inductor L1 is coupled to a first end of sense resistor RS and a second end of sense resistor RS is coupled to the drain of third NMOSFET and to the drain of fourth NMOSFET M4. The source of third NMOSFET M3 is coupled to the common potential and the source of fourth NMOSFET M4 is coupled to a first end of output capacitor COUT, to a first end of voltage divider 190 and to the output of converter 10, the voltage at the output of converter 10 denoted Vout.

A divided voltage node of voltage divider 190 is coupled to a first input of transconductance amplifier TCA and a second end of voltage divider 190 is coupled to the common potential. A second input of transconductance amplifier TCA is coupled to a first end of TCA reference voltage source 200 and a second end of TCA reference voltage source 200 is coupled to the common potential. The output of transconductance amplifier TCA is coupled to a first end of error circuitry resistor RE, to the positive end of low threshold voltage source 50 and to the negative end of high threshold voltage source 60. The negative end of low threshold voltage source 50 is coupled to the non-inverting input of low threshold comparator 230 and the positive end of high threshold voltage source 60 is coupled to the inverting input of high threshold comparator 220. The inverting input of low threshold comparator 230 and the non-inverting input of high threshold comparator 220 are each coupled to the output of current sense amplifier CSA. The non-inverting input of current sense amplifier CSA is coupled to the first end of sense resistor RS and the inverting input of current sense amplifier CSA is coupled to the second end sense resistor RS. The output of high threshold comparator 220 is coupled to the reset input of control SR flip flop SR1 and the output of low threshold comparator 230 is coupled to the set input of control SR flip flop SR1. The Q bar output of control SR flip flop SR1 is coupled to a respective input of switching control unit 210 and the Q output of control SR flip flop SR1 is coupled to a respective input of switching control unit 210 and to the clock input of first PLL D flip flop D1 and is denoted SR1Q.

The output of external clock 80 is coupled to the clock input of second PLL D flip flop D2 and the D input of each of first PLL D flip flop D1 and second PLL D flip flop D2 is coupled to a supply voltage, denoted VCC. The Q output of first PLL D flip flop D1 is coupled to a first input of PLL NAND gate 140 and to a control input of first PLL electronically controlled switch 150. The Q output of second PLL D flip flop D2 is coupled to a second input of PLL NAND gate 140 and to a control input of second PLL electronically controlled switch 160. The output of PLL NAND gate 140 is coupled to the clear input each of first PLL D flip flop D1 and second PLL D flip flop D2. The output of first PLL current source 170 is coupled to a first terminal of first PLL electronically controlled switch 150 and the input of first PLL current source 170 is coupled to supply voltage VCC. A second terminal of first PLL electronically controlled switch 150 is coupled to a first end of PLL capacitor CP and to a first terminal of second PLL electronically controlled switch 160. A second terminal of second PLL electronically controlled switch 160 is coupled to the input of second PLL current source 180 and the output of second PLL current source 180 is coupled to the common potential. A second end of PLL capacitor CP is coupled to the common potential. The first end of PLL capacitor CP, defining the output of PLL 30 and denoted ΔH, is coupled to a control input of low threshold voltage source 50 and high threshold voltage source 60.

A first input of mode control circuitry 20 is coupled to input voltage Vin and a second input of mode control circuitry 20 is coupled to output voltage Vout. In particular, the non-inverting input of buck mode comparator 90 and the inverting input of boost mode comparator 110 are each coupled to input voltage Vin; and the negative end of buck mode voltage source 100 and the positive end of boost mode voltage source 120 are each coupled to output voltage Vout. The positive end of buck mode voltage source 100 is coupled to the inverting input of buck mode comparator 90 and the output of buck mode comparator 90 is coupled to a first input of buck-boost NOR gate 130 and to a respective input of switching control unit 210, and is denoted BUCK. The negative end of boost mode voltage source 120 is coupled to the non-inverting input of boost mode comparator 110 and the output of boost mode comparator 110 is coupled to a second input of buck-boost NOR gate 130 and to a respective input of switching control unit 210, and is denoted BOOST. The output of buck-boost NOR gate 130 is coupled to a respective input of switching control unit 210, and is denoted BUCK-BOOST.

In operation, when input voltage Vin is greater than output voltage Vout by at least the offset generated by buck mode voltage source 100 the output of buck mode comparator 90 is high and switching control unit 210 is arranged to operate in a buck mode. In the buck mode, switching control unit 210 is arranged to alternately couple inductor L1 between the input of converter 10 and the output of converter 10 and couple inductor L1 between the output of converter 10 and the common potential, responsive to the current flowing through inductor L1, denoted Ih, and the output of output voltage error circuitry 40. In particular, a portion of output voltage Vout is compared to the voltage output by TCA reference voltage source 200, denoted VREF. The difference between the portion of output voltage Vout and reference voltage VREF is output by TCA reference voltage source 200 as a current which charges and discharges error circuitry capacitor CE, the voltage across error circuitry resistor RE and error circuitry capacitor CE denoted error voltage EA. Particularly, in the event that output voltage Vout is less than reference voltage VREF, the current output by TCA reference voltage source 200 charges error circuitry capacitor CE and in the event that output voltage Vout is greater than reference voltage VREF, the current output by TCA reference voltage source 200 discharges error circuitry capacitor CE.

A voltage representation of the current flowing through inductor L1, denoted VC, is output by current sense amplifier CSA and compared to error voltage EA offset by each of low threshold voltage source 50 and high threshold voltage source 60. In the event that voltage representation VC is less than error voltage EA offset by low threshold voltage source 50, control SR flip flop SR1 is set and switching control unit 210 is arranged to: close first NMOSFET M1 and fourth NMOSFET M4; and open second NMOSFET M2 and third NMOSFET M3. The voltage across inductor L1 is thus Vin−Vout and the current thereacross, denoted Ih, increases at a rate of (Vin−Vout)/L. In the event that voltage representation VC is greater than error voltage EA offset by high threshold voltage source 60, control SR flip flop SR1 is reset and switching control unit 210 is arranged to: open first NMOSFET M1 and third NMOSFET M3; and close second NMOSFET M2 and fourth NMOSFET M4. The voltage across inductor L1 is thus −Vout and current Ih decreases at a rate of Vout/L. Control circuitry 70 thus provides hysteretic control of converter 10 since voltage representation VC is compared to a positive and negative offset of error voltage EA and the position of the switches are adjusted responsive to the offsets of error voltage EA.

In the event that input voltage Vin is not greater than output voltage Vout by the offset of buck mode voltage source 100 and is not less than output voltage Vout by the offset of boost mode voltage source 120, the output of buck-boost mode NOR gate 130 is high and control circuitry 70 is arranged to operate in a buck-boost mode. In the buck-boost mode, switching control unit 210 is arranged to alternately couple inductor L1 between the input of converter 10 and the common potential and couple inductor L1 between the output of converter 10 and the common potential. In particular, in the event that voltage representation VC is less than error voltage EA offset by low threshold voltage source 50, control SR flip flop SR1 is set and switching control unit 210 is arranged to: close first NMOSFET M1 and third NMOSFET M3; and open second NMOSFET M2 and fourth NMOSFET M4. The voltage across inductor L1 is thus Vin and current Ih increases at a rate of Vin/L. In the event that voltage representation VC is greater than error voltage EA offset by high threshold voltage source 60, control SR flip flop SR1 is reset and switching control unit 210 is arranged to: open first NMOSFET M1 and third NMOSFET M3; and close second NMOSFET M2 and fourth NMOSFET M4. The voltage across inductor L1 is thus −Vout and current Ih decreases at a rate of Vout/L.

In the event that input voltage Vin is less than output voltage Vout by at least the offset of boost mode voltage source 120, the output of boost mode comparator 110 is high and control circuitry 70 is arranged to operate in a boost mode. In the boost mode, switching control unit 210 is arranged to alternately couple inductor L1 between the input of converter 10 and the common potential and couple inductor L1 between the input of converter 10 and the output of converter 10. In particular, in the event that voltage representation VC is less than error voltage EA offset by low threshold voltage source 50, control SR flip flop SR1 is set and switching control unit 210 is arranged to: close first NMOSFET M1 and third NMOSFET M3; and open second NMOSFET M2 and fourth NMOSFET M4. The voltage across inductor L1 is thus Vin and current Ih increases at a rate of Vin/L. In the event that voltage representation VC is greater than error voltage EA offset by high threshold voltage source 60, control SR flip flop SR1 is reset and switching control unit 210 is arranged to: open second NMOSFET M2 and third NMOSFET M3; and close first NMOSFET M1 and fourth NMOSFET M4. The voltage across inductor L1 is thus Vin−Vout and current Ih decreases at a rate (Vout−Vin)/L.

Since the switching frequency of converter 10 is responsive to output voltage Vout and inductor Ih, the switching frequency is not fixed. A non-fixed switching frequency causes random noise and is therefore not desired. PLL 30 is arranged to cause converter 10 to maintain a fixed frequency. In particular, each time control SR flip flop SR1 is set, the Q output of first PLL flip flop D1 is arranged to output a logical high signal and first PLL electronically controlled switch 150 is closed responsive to the logical high signal. First PLL current source 170 is arranged to output a current thereby charging PLL capacitor CP. At the rising edge of external clock 80, denoted CLK, the Q output of second PLL flip flop D2 is arranged to output a logical high signal and second PLL electronically controlled switch 160 is closed responsive to the received logical high signal. Second PLL current source 180 is arranged to output a current thereby discharging PLL capacitor CP. When the outputs of both first PLL flip flop D1 and second PLL flip flop D2 both output logical high signals, PLL NAND gate 140 is arranged to clear first PLL flip flop D1 and second PLL flip flop D2.

Output ΔH of PLL 30 is arranged to adjust the value of the voltage output by low threshold voltage source 50 and high threshold voltage source 60. An increase in ΔH causes an increase in the voltage output by low threshold voltage source 50 and high threshold voltage source 60, thereby increasing the high and low offsets of error voltage EA, and a decrease in ΔH causes a decrease in the voltage output by low threshold voltage source 50 and high threshold voltage source 60, thereby decreasing the offsets of error voltage EA. An increase in the offsets of error voltage EA causes the switching frequency of converter 10 to decrease and a decrease in the offsets of error voltage EA causes the switching frequency of converter 10 to increase. The adjustment of the offsets of error voltage EA drives the switching frequency of converter 10 to be equal to the fixed frequency of external clock 80 over time.

FIG. 2D illustrates a graph of inductor current Ih of converter 10 as a function of input voltage Vin of converter 10, where the x-axis represents voltage and the y-axis represents current. As described above, over time input voltage Vin may decrease responsive to battery discharge and converter 10 operates in a first period, denoted P1, in the buck mode as long as Vin is appreciably greater than Vout. As input voltage Vin continues to decrease, and Vin approaches Vout, converter 10 operates in a second period, denoted P2, in the buck-boost mode. As input voltage Vin continues to decrease, to be appreciably less than Vout, converter 10 operates in a third period, denoted P3, in the boost mode. As illustrated by curve 250, when converter 10 switches between the buck mode of period P1 and the buck-boost mode of period P2; and when converter 10 switches between the buck-boost mode of period P2 and the boost mode of period P3, there is a discontinuity in inductor current Ih. In particular, during the buck mode inductor current Ih is given as:

$$Ih = \frac{1}{Fsw \cdot L} \cdot \left[ Vout \cdot \left(1 - \frac{Vout}{Vin}\right)\right] \quad \text{EQ. 2}$$

during the buck-boost mode inductor current Ih is given as:

$$Ih = \frac{1}{Fsw\_buck\_boost} \cdot \frac{Vin \cdot Vout}{L \cdot (Vin + Vout)} \quad \text{EQ. 3}$$

and in the boost mode inductor current Ih is given as:

$$Ih = \frac{1}{Fsw \cdot L} \cdot \left[ Vin \cdot \left(1 - \frac{Vin}{Vout}\right)\right] \quad \text{EQ. 4}$$

where Fsw is the switching frequency of converter 10 which is fixed, as described above, responsive to the PLL.

FIG. 2E is a simplified illustration of inductor current Ih, where the x-axis denotes time and the y-axis denotes current. As shown, during period P1, when converter 10 is in the buck mode, inductor Ih increases at a rate of (Vin−Vout)/L when inductor L1 is coupled between input voltage Vin and output voltage Vout and decreases at a rate of Vout/L when inductor L1 is coupled between output voltage Vout and the common potential. During period P2, when converter 10 is in the buck-boost mode, inductor Ih increases at a rate of Vin/L when inductor L1 is coupled between input voltage Vin and the common potential and decreases at a rate of Vout/L when inductor L1 is coupled between output voltage Vout and the common potential. During period P3, when converter 10 is in the boost mode, inductor Ih increases at a rate of Vin/L when inductor L1 is coupled between input voltage Vin and the common potential and decreases at a rate of (Vout−Vin)/L when inductor L1 is coupled between input voltage Vin and output voltage Vout. As shown by lines 251 and 252, during the buck mode of converter 10 PLL 30 decreases the hysteretic offsets of error voltage VA. As converter 10 switches to the buck-boost mode the peak of inductor current Ih and therefore the output ripple amplitude suddenly increases because of the increase in the inductor voltage. As converter 10 switches to the boost mode the peak of inductor current Ih and therefore the output ripple amplitude suddenly decreases because of the reduction in the inductor voltage. Disadvantageously, the discontinuation in inductor current Ih causes unwanted noise.

There is thus a long felt need for a hysteretic current mode control converter which provides for an inductor current with a reduced discontinuation when the converter switches between modes.

SUMMARY OF THE INVENTION

Accordingly, it is a principal object of the present invention to overcome the disadvantages of prior art port current control circuits. Particularly, in one embodiment, a hysteretic current mode control converter is provided, the converter constituted of: an inductor; a plurality of electronically controlled switches; and a control circuitry arranged to operate in a buck-boost mode responsive to the output voltage of the converter being within a first predetermined range of the input voltage of the converter, the control circuitry arranged in the buck-boost mode: responsive to a current flowing through the inductor being lower than a predetermined low current threshold, to control the switches to couple the inductor between the input voltage and a common potential; responsive to the current flowing through the inductor being greater than a predetermined medium current threshold, to control the switches to couple the inductor between the input voltage and the output voltage; and responsive to the current flowing through the inductor being greater than a predetermined high current threshold, to control the switches to couple the inductor between the output voltage and the common potential. In one embodiment, a fixed frequency circuitry is provided, the fixed frequency circuitry arranged to adjust at least one of the low current threshold, medium current threshold and the high current threshold such that the switching frequency of the converter remains constant.

Additional features and advantages of the invention will become apparent from the following drawings and description.

BRIEF DESCRIPTION OF THE DRAWINGS

For a better understanding of the invention and to show how the same may be carried into effect, reference will now be made, purely by way of example, to the accompanying drawings in which like numerals designate corresponding elements or sections throughout.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings:

FIGS. 2B-2C illustrate various portions of the prior art converter of FIG. 2A;

FIG. 5 illustrates a high level flow chart of a first method of controlling a hysteretic current mode control converter;

DETAILED DESCRIPTION OF THE PREFERRED EMBODIMENTS

Figure 1:
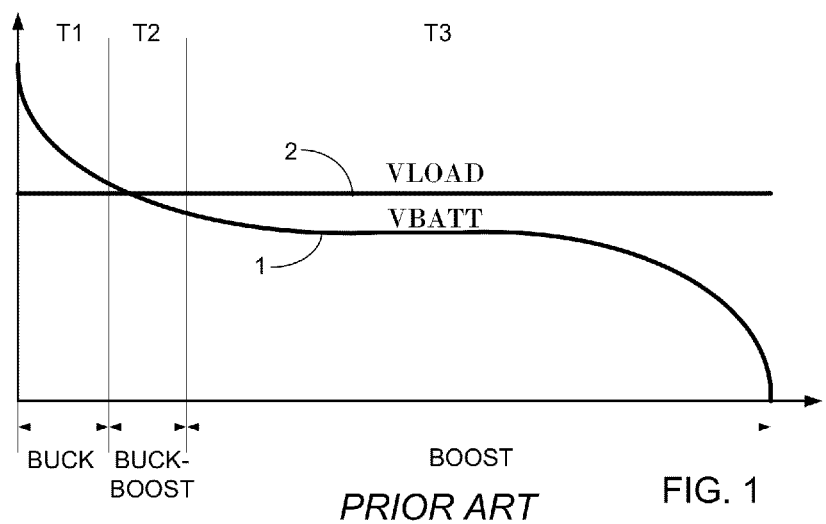
FIG. 1 illustrates a graph of the different stages of a hysteretic current mode control converter known to the prior art.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

Figure 3:
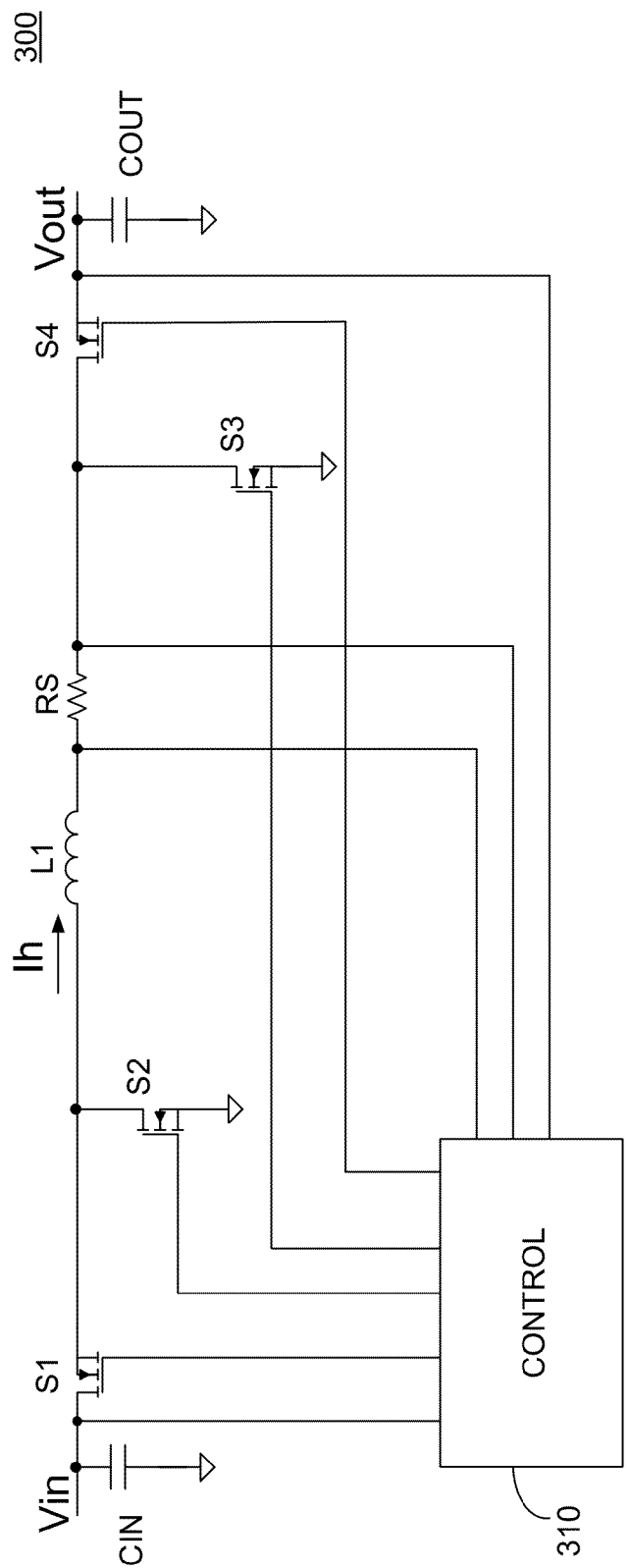
FIG. 3 illustrates a high level schematic diagram of a first embodiment of a hysteretic current mode control converter.

FIG. 3 illustrates a high level schematic diagram of a hysteretic current mode control converter 300, according to certain embodiments. Converter 300 comprises: a control circuitry 310; an input capacitor CIN; a first electronically controlled switch S1; a second electronically controlled switch S2; a third electronically controlled switch S3; a fourth electronically controlled switch S4; an inductor L1; a sense resistor RS; an output capacitor COUT; and a control circuitry 310. First electronically controlled switch S1, second electronically controlled switch S2, third electronically controlled switch S3 and fourth electronically controlled switch S4 are each illustrated and described herein as an NMOSFET, however this is not meant to be limiting in any way.

A first end of input capacitor CIN is coupled to the input of converter 300 and to the drain of first electronically controlled switch S1 and a second end of input capacitor CIN is coupled to a common potential. The voltage at the input of converter 300 is denoted Vin and is coupled to a respective input of control circuitry 310. The source of first electronically controlled switch S1 is coupled to a first end of inductor L1 and to the drain of second electronically controlled switch S2 and the source of second electronically controlled switch S2 is coupled to the common potential. A second end of inductor L1 is coupled to a first end of sense resistor RS and a second end of sense resistor RS is coupled to the drain of third electronically controlled switch and to the drain of fourth electronically controlled switch S4. The source of third electronically controlled switch S3 is coupled to the common potential and the source of fourth electronically controlled switch S4 is coupled to a first end of output capacitor COUT and to the output of converter 300, the voltage at the output of converter 300 denoted Vout and coupled to a respective input of control circuitry 310. Each of the first end and the second end of sense resistor RS is coupled to a respective input of control circuitry 310. Each of a plurality of outputs of control circuitry 310 is coupled to the gate of a respective one of first electronically controlled switch S1, second electronically controlled switch S2, third electronically controlled switch S3 and fourth electronically controlled switch S4.

Buck Mode Operation

In operation, responsive to input voltage Vin being greater than output voltage Vout by at least a first predetermined value, denoted V1, control circuitry 310 is arranged to operate in a buck mode. In the buck mode, control circuitry 310 is arranged to compare the current flowing through inductor L1, denoted Ih, as detected across sense resistor RS, with a low current threshold, denoted VL, and in the event that Ih is lower than low current threshold VL, control circuitry 310 is arranged to: close first electronically controlled switch S1 and fourth electronically controlled switch S4; and open second electronically controlled switch S2 and third electronically controlled switch S3. Inductor L1 is thus coupled between input voltage Vin and output voltage Vout and current Ih increases at a rate of (Vin−Vout)/L.

Control circuitry 310 is further arranged to compare inductor current Ih, as detected across sense resistor RS, with a high current threshold, denoted VH, and in the event that inductor current Ih is greater than high current threshold VH, control circuitry 310 is arranged to: close second electronically controlled switch S2 and fourth electronically controlled switch S4; and open first electronically controlled switch S1 and third electronically controlled switch S3. Inductor L1 is thus coupled between output voltage Vout and the common potential and current Ih decreases at a rate of Vout/L. High current threshold VH is greater than low current threshold VL. Inductor current Ih thus regularly increases and decreases between low current threshold VL and high current threshold VH.

Buck-Boost Mode

As described above, in some applications input voltage Vin decreases over time. When input voltage Vin decreases to be within a predetermined range of output voltage Vout, control circuitry 310 is arranged to operate in a buck-boost mode. Preferably, the upper end of the predetermined range is substantially equal to first predetermined value V1 of the buck mode. In the buck-boost mode control circuitry 310 is arranged to compare inductor current Ih, with various thresholds as described below. In the event that inductor current Ih is lower than predetermined low current threshold VL, control circuitry 310 is arranged to: close first electronically controlled switch S1 and third electronically controlled switch S3; and open second electronically controlled switch S2 and fourth electronically controlled switch S4. Inductor L1 is thus coupled between input voltage Vin and the common potential and current Ih increases at a rate of Vin/L.

In the event that inductor current Ih is greater than a predetermined medium current threshold, denoted VM, control circuitry 310 is arranged to: close first electronically controlled switch S1 and fourth electronically controlled switch S4; and open second electronically controlled switch S2 and third electronically controlled switch S3. Inductor L1 is thus coupled between input voltage Vin and output voltage Vout and inductor current Ih continues to increase at a reduced rate of (Vin−Vout)/L. Predetermined medium current threshold VM is greater than low current threshold VL and less than high current threshold VH.

In the event that inductor current Ih is greater than predetermined high current threshold VH, control circuitry 310 is arranged to: close second electronically controlled switch S2 and fourth electronically controlled switch S4; and open first electronically controlled switch S1 and third electronically controlled switch S3. Inductor L1 is thus coupled between output voltage and the common potential and inductor current Ih decreases at a rate of Vout/L. Inductor current Ih thus regularly increases and decreases between low current threshold VL and high current threshold VH with the rise of inductor current Ih from low current threshold VL starting at a rate of Vin/L until reaching medium current threshold VM and then rising at a lower rate of (Vin−Vout)/L until reaching high current threshold VH.

Boost Mode

When input voltage Vin becomes lower than output voltage Vout by a second predetermined value, denoted V2, control circuitry 310 is arranged to operate in a boost mode. Preferably, second predetermined value V2 further defines the lower end of the predetermined range of the buck boost mode. In the boost mode, control circuitry 310 is arranged to measure inductor current Ih, as described above. In the event that inductor current Ih is lower than the predetermined low current threshold, control circuitry 310 is arranged to: close first electronically controlled switch S1 and third electronically controlled switch S3; and open second electronically controlled switch S2 and fourth electronically controlled switch S4. Inductor L1 is thus coupled between input voltage Vin and the common potential and inductor current Ih rises at a rate of Vin/L. In the event that inductor current Ih is greater than the predetermined high current threshold, control circuitry 310 is arranged to: close first electronically controlled switch S1 and fourth electronically controlled switch S4; and open second electronically controlled switch S2 and third electronically controlled switch S3. Inductor L1 is thus coupled between input voltage Vin and output voltage Vout and inductor current Ih decreases at a rate of (Vin−Vout)/L since input voltage Vin is less than output voltage Vout. Inductor current Ih thus regularly increases and decreases between the low current threshold and the high current threshold.

In one embodiment, as will be described below, control circuitry 310 is further arranged to adjust the low, medium and high current thresholds to thereby maintain the switching frequency of converter 300 at a fixed frequency. Advantageously, the arrangement and operation of converter 300 significantly reduces the discontinuations in inductor current Ih when switching between the different converter modes, as will be described below. In another embodiment, as will be described below in relation to FIG. 6A, the buck-boost mode is at least partially replaced with a non-switching mode wherein first electronically controlled switch S1 and fourth electronically controlled switch S4 are closed, and second electronically controlled switch S2 and third electronically controlled switch S3 are open and no switching occurs during the non-switching mode.

Figure 4A:
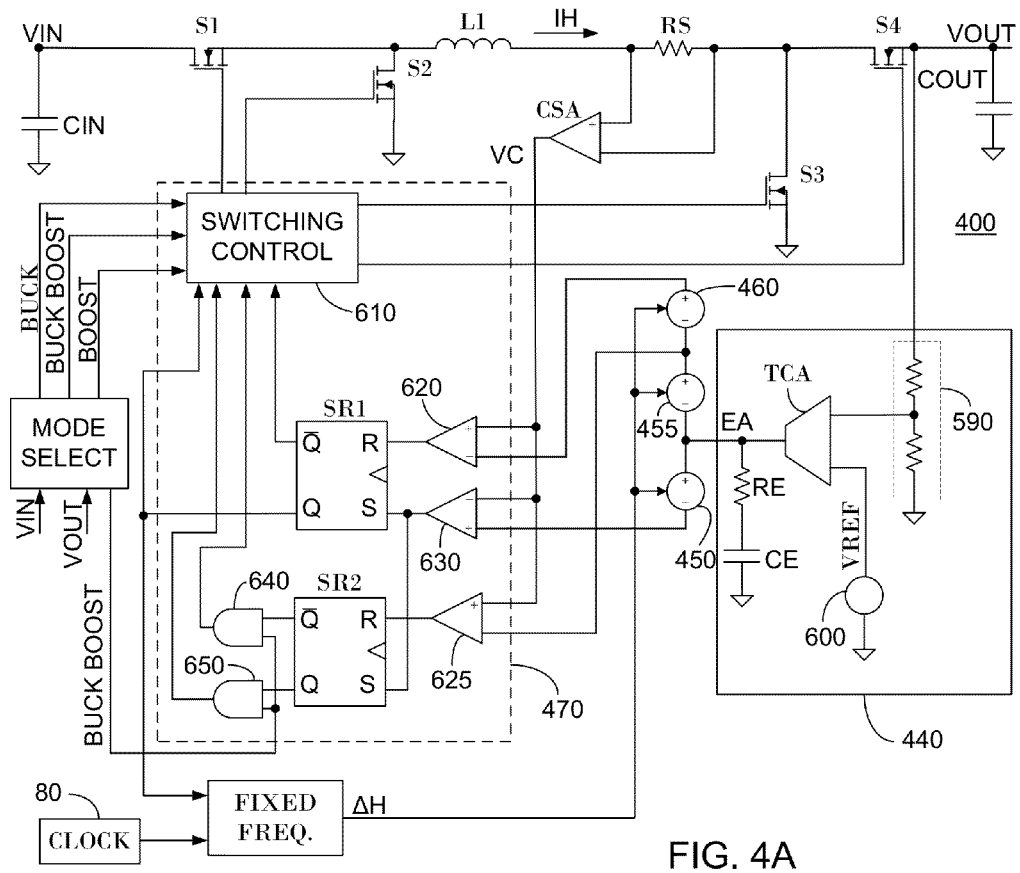
FIG. 4A illustrates a high level schematic diagram of a second embodiment of a hysteretic current mode control converter.
Figure 4B:
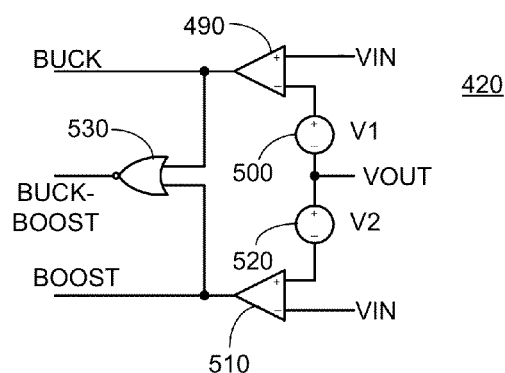
FIGS. 4B-4C illustrate various portions of the converter of FIG. 4A.
Figure 4C:
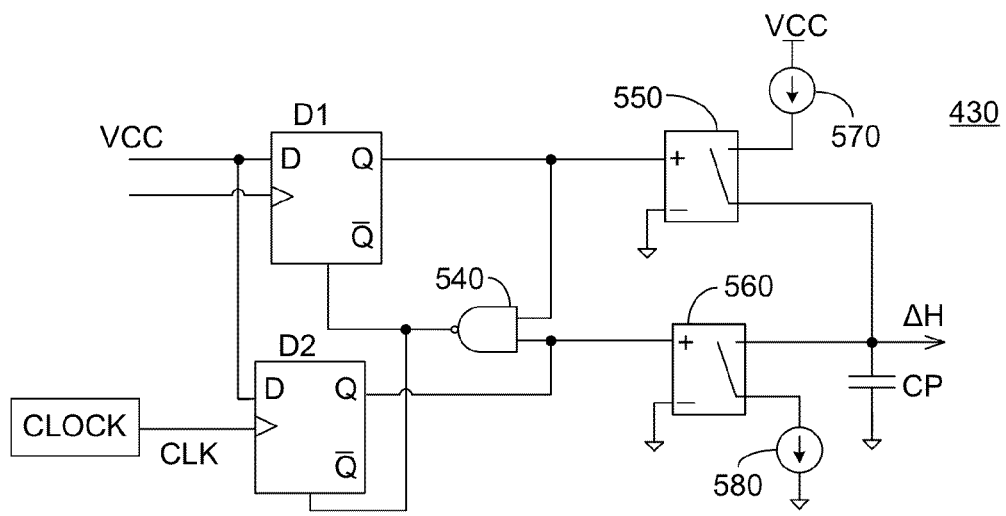

FIGS. 4A-4C illustrate a high level schematic diagram of a second embodiment of a hysteretic current mode control converter. In particular, FIG. 4A illustrates a high level schematic diagram of a hysteretic current mode control converter 400; FIG. 4B illustrates a mode control circuitry 420 arranged to control the mode of converter 400; and FIG. 4C illustrates a fixed frequency circuitry 430 arranged to adjust the hysteresis levels of converter 400, the figures being described together. Converter 400 comprises: mode control circuitry 420; fixed frequency circuitry 430; an input capacitor CIN; a first electronically controlled switch S1; a second electronically controlled switch S2; a third electronically controlled switch S3; a fourth electronically controlled switch S4; an inductor L1; a sense resistor RS; an output capacitor COUT; an output voltage error circuitry 440; a low threshold voltage source 450; a medium threshold voltage source 455; a high threshold voltage source 460; a control circuitry 470; a current sense differential amplifier CSA, which in one embodiment is implemented as an operational amplifier (op-amp); and an external clock 480. Preferably, low threshold voltage source 450 defines low voltage threshold VL as described above, medium threshold voltage source 455 defines medium voltage threshold VM as described above, and high voltage source 460 defined high voltage threshold VH as described above.

Mode control circuitry 420 comprises: a buck mode comparator 490; a buck mode voltage source 500; a boost mode comparator 510; a boost mode voltage source 520; and a buck-boost NOR gate 530. Fixed frequency circuitry 430 comprises: a first fixed frequency circuitry flip flop D1, which in one embodiment is implemented as a D flip flop; a second fixed frequency circuitry flip flop D2, which in one embodiment is implemented as a D flip flop; a fixed frequency circuitry NAND gate 540; a first fixed frequency circuitry electronically controlled switch 550; a second fixed frequency circuitry electronically controlled switch 560; a first fixed frequency circuitry current source 570; a second fixed frequency circuitry current source 580; and a fixed frequency circuitry capacitor CP. Output voltage error circuitry 440 comprises: a voltage divider 590; a transconductance amplifier TCA; a TCA reference voltage source 600; an error circuitry resistor RE; and an error circuitry capacitor CE. Control circuitry 470 comprises: a switching control unit 610; a high threshold comparator 620; a medium threshold comparator 625; a low threshold comparator 630; a first control flip flop SR1, which in one embodiment is implemented as an SR flip flop; a second control flip flop SR2, which in one embodiment is implemented as an SR flip flop; a first control AND gate 640; and a second control AND gate 650.

A first end of input capacitor CIN is coupled to the input of converter 400 and to the drain of first electronically controlled switch S1 and a second end of input capacitor CIN is coupled to a common potential. The voltage at the input of converter 400 is denoted Vin. The source of first electronically controlled switch S1 is coupled to a first end of inductor L1 and to the drain of second electronically controlled switch S2 and the source of second electronically controlled switch S2 is coupled to the common potential. A second end of inductor L1 is coupled to a first end of sense resistor RS and a second end of sense resistor RS is coupled to the drain of third electronically controlled switch S3 and to the drain of fourth electronically controlled switch S4. The source of third electronically controlled switch S3 is coupled to the common potential and the source of fourth electronically controlled switch S4 is coupled to a first end of output capacitor COUT, to a first end of voltage divider 590 and to the output of converter 400, the voltage at the output of converter 400 denoted Vout.

A divided voltage node of voltage divider 590 is coupled to a first input of transconductance amplifier TCA and a second end of voltage divider 590 is coupled to the common potential. A second input of transconductance amplifier TCA is coupled to a first end of TCA reference voltage source 600 and a second end of TCA reference voltage source 600 is coupled to the common potential. The output of transconductance amplifier TCA is coupled to a first end of error circuitry resistor RE, to the positive end of low threshold voltage source 450 and to the negative end of medium threshold voltage source 455. The negative end of low threshold voltage source 450 is coupled to the non-inverting input of low threshold comparator 630 and the positive end of medium threshold voltage source 455 is coupled to the negative end of high threshold voltage source 460 and to the inverting input of medium threshold comparator 625. The positive end of high threshold voltage source 455 is coupled to the inverting input of high threshold comparator 630. The inverting input of low threshold comparator 630, the non-inverting input of medium threshold comparator 625 and the non-inverting input of high threshold comparator 620 are each coupled to the output of current sense amplifier CSA. The non-inverting input of current sense amplifier CSA is coupled to the first end of sense resistor RS and the inverting input of current sense amplifier CSA is coupled to the second end sense resistor RS.

The output of high threshold comparator 620 is coupled to the reset input of first control flip flop SR1, the output of medium threshold comparator 625 is coupled to the reset input of second control flip flop SR2 and the output of low threshold comparator 630 is coupled to the set input of each of first control flip flop SR1 and second control flip flop SR2. The Q bar output of first control flip flop SR1 is coupled to a respective input of switching control unit 610 and the Q output of first control flip flop SR1 is coupled to a respective input of switching control unit 610 and to the clock input of first fixed frequency circuitry flip flop D1. The Q bar output of second control flip flop SR2 is coupled to a first input of first control AND gate 640 and the Q output of second control flip flop SR2 is coupled to a first input of second control AND gate 650. The output of buck-boost NOR gate 530 of mode control circuitry 420 is coupled to a second input of first control AND gate 640 and to a second input of second control AND gate 650. The output of each of first control AND gate 640 and second control AND gate 650 is coupled to a respective input of switching control unit 610.

The output of external clock 480 is coupled to the clock input of second fixed frequency circuitry flip flop D2 and the input of each of first fixed frequency circuitry flip flop D1 and second fixed frequency circuitry flip flop D2 is coupled to a supply voltage, denoted VCC. The Q output of first fixed frequency circuitry flip flop D1 is coupled to a first input of fixed frequency circuitry NAND gate 540 and to a control input of first fixed frequency circuitry electronically controlled switch 550. The Q output of second fixed frequency circuitry flip flop D2 is coupled to a second input of fixed frequency circuitry NAND gate 540 and to a control input of second fixed frequency circuitry electronically controlled switch 560. The output of fixed frequency circuitry NAND gate 540 is coupled to the clear input each of first fixed frequency circuitry flip flop D1 and second fixed frequency circuitry flip flop D2. The output of first fixed frequency circuitry current source 570 is coupled to a first terminal of first fixed frequency circuitry electronically controlled switch 550 and the input of first fixed frequency circuitry current source 570 is coupled to supply voltage VCC. A second terminal of first fixed frequency circuitry electronically controlled switch 550 is coupled to a first end of fixed frequency circuitry capacitor CP and to a first terminal of second fixed frequency circuitry electronically controlled switch 560. A second terminal of second fixed frequency circuitry electronically controlled switch 560 is coupled to the input of second fixed frequency circuitry current source 580 and the output of second fixed frequency circuitry current source 580 is coupled to the common potential. A second end of fixed frequency circuitry capacitor CP is coupled to the common potential. The first end of fixed frequency circuitry capacitor CP, defining the output of fixed frequency circuitry 430 and denoted ΔH, is coupled to a control input of each of low threshold voltage source 450, medium threshold voltage source 455 and high threshold voltage source 460.

A first input of mode control circuitry 420 is coupled to input voltage Vin and a second input of mode control circuitry 420 is coupled to output voltage Vout. In particular, the non-inverting input of buck mode comparator 490 and the inverting input of boost mode comparator 510 are each coupled to input voltage Vin; and the negative end of buck mode voltage source 500 and the positive end of boost mode voltage source 520 is coupled to output voltage Vout. The positive end of buck mode voltage source is coupled to the inverting input of buck mode comparator 490. The output of buck mode comparator 490 is coupled to a first input of buck-boost NOR gate 530 and to a respective input of switching control unit 610 and is denoted BUCK. The negative end of boost mode voltage source 520 is coupled to the non-inverting input of boost mode comparator 510. The output of boost mode comparator 510 is coupled to a second input of buck-boost NOR gate 530 and to a respective input of switching control unit 610 and is denoted BOOST. The output of buck-boost NOR gate 530 is coupled to a respective input of switching control unit 610 and to the second input of each of first control AND gate 640 and second control AND gate 650, as described above, and is denoted BUCK-BOOST.

In operation, when input voltage Vin is greater than output voltage Vout by at least the first predetermined value generated by buck mode voltage source 500, which outputs voltage V1 as described above, the output of buck mode comparator 490 is high and switching control unit 610 is arranged to operate in a buck mode. In the buck mode, switching control unit 610 is arranged to alternately couple inductor L1 between the input of converter 400 and the output of converter 400 and couple inductor L1 between the output of converter 400 and the common potential, responsive to the current flowing through inductor L1, denoted Ih, and the output of output voltage error circuitry 640. In particular, a portion of output voltage Vout is compared to the voltage output by TCA reference voltage source 600, denoted VREF. The difference between the portion of output voltage Vout and reference voltage VREF is output by TCA reference voltage source 600 as a current which charges and discharges error circuitry capacitor CE, the voltage across error circuitry resistor RE and error circuitry capacitor CE denoted error voltage EA. Particularly, in the event that output voltage Vout is less than reference voltage VREF, the current output by TCA reference voltage source 600 charges error circuitry capacitor CE and in the event that output voltage Vout is greater than reference voltage VREF, the current output by TCA reference voltage source 600 discharges error circuitry capacitor CE.

A voltage representation of inductor current Ih, denoted VC, is output by current sense amplifier CSA and compared to error voltage EA offset by each of low threshold voltage source 450, medium threshold voltage source 455 and high threshold voltage source 460. In the event that voltage representation VC is less than error voltage EA offset by low threshold voltage source 450, first control flip flop SR1 is set and switching control unit 610 is arranged to: close first electronically controlled switch S1 and fourth electronically controlled switch S4; and open second electronically controlled switch S2 and third electronically controlled switch S3. The voltage across inductor L1 is thus Vin−Vout and inductor current Ih, increases at a rate of (Vin−Vout)/L, where L is the inductance of inductor L1. In the event that voltage representation VC is greater than error voltage EA offset by the combination of medium threshold voltage source 455 and high threshold voltage source 460, first control flip flop SR1 is reset and switching control unit 610 is arranged to: open first electronically controlled switch S1 and third electronically controlled switch S3; and close second electronically controlled switch S2 and fourth electronically controlled switch S4. The voltage across inductor L1 is thus −Vout and inductor current Ih decreases at a rate of Vout/L. Control circuitry 470 thus provides hysteretic control of converter 400 since voltage representation VC is compared to a positive and negative offset of error voltage EA. Inductor current Ih thus regularly increases and decreases between a low current threshold, defined by error voltage EA and low threshold voltage source 450, which defines low voltage threshold VL, and a high current threshold, defined by error voltage EA and the combination of medium threshold voltage source 455 and high threshold voltage source 460, which defines high voltage threshold VH.

As described above, in some applications input voltage Vin decreases over time. When input voltage Vin decreases to be within a first predetermined range of output voltage Vout defined by the positive offset of buck mode voltage source 500, i.e. V1, and the negative offset of boost mode voltage source 520, i.e. V2, the output of buck-boost mode NOR gate 530 is high and switching control unit 610 is arranged to operate in a buck-boost mode. In the buck-boost mode, switching control unit 610 is arranged to alternately: couple inductor L1 between the input of converter 400 and the common potential; couple inductor L1 between the input of converter 400 and the output of converter 400; and couple inductor L1 between the output of converter 10 and the common potential. In particular, in the event that voltage representation VC is less than error voltage EA offset by low threshold voltage source 450, which defines VL, first control flip flop SR1 is set and switching control unit 610 is arranged to: close first electronically controlled switch S1 and third electronically controlled switch S3; and open second electronically controlled switch S2 and fourth electronically controlled switch S4. The voltage across inductor L1 is thus Vin and current Ih increases at a rate of Vin/L.

When voltage representation VC becomes greater than error voltage EA offset by medium threshold voltage source 455, which defined VM, the output of medium threshold comparator 625 is high and second control flip flop SR2 is reset. The Q output of second control flip flop SR2 is low and the Q bar output of second control flip flop SR2 is high. Since the output of buck-boost NOR gate 530 is high, the output of first control AND gate 640 is high and switching control unit 610 is arranged to: open second electronically controlled switch S2 and third electronically controlled switch S3 and close first electronically controlled switch S1 and fourth electronically controlled switch S4. The voltage across inductor L1 is thus Vin−Vout and inductor current Ih continues to increase at a lower rate of (Vin−Vout)/L.

When voltage representation VC becomes greater than error voltage EA offset by the combination of medium threshold voltage source 455 and high threshold voltage source 460, which defines VH, first control flip flop SR1 is reset and switching control unit 610 is arranged to: open first electronically controlled switch S1 and third electronically controlled switch S3; and close second electronically controlled switch S2 and fourth electronically controlled switch S4. The voltage across inductor L1 is thus −Vout and current Ih decreases at a rate of Vout/L. Thus, inductor current Ih regularly increases and decreases between the low current threshold VL and the high current threshold VH. When inductor current Ih rises above the medium current threshold, defined by error voltage EA and medium threshold voltage source 455, i.e. VM, the rate of increase of inductor current Ih is reduced.

In the event inductor current Ih decreases until reaching a non-switching mode threshold, which in one embodiment is defined as where Vin is within 0.2 volts of Vout, switching control unit 610 operates in a non-switching mode and is arranged to: close first electronically controlled switch S1 and fourth electronically controlled switch S4; and open second electronically controlled switch S2 and third electronically controlled switch S3. During the non-switching mode switching control unit 610 remains in the non-switching mode and does not adjust the position of any of the switches regardless of the outputs of first control flip flop SR1 and second control flip flop SR2.

In the event that input voltage Vin becomes less than output voltage Vout by at least a second predetermined value, defined by the offset of boost mode voltage source 520, i.e. by V2, the output of boost mode comparator 510 is high and switching control unit 610 is arranged to operate in a boost mode. In the boost mode, switching control unit 610 is arranged to alternately: couple inductor L1 between the input of converter 400 and the common potential; and couple inductor L1 between the input of converter 400 and the output of converter 400. In particular, in the event that voltage representation VC is less than error voltage EA offset by low threshold voltage source 450, switching control unit 610 is arranged to: close first electronically controlled switch S1 and third electronically controlled switch S3; and open second electronically controlled switch S2 and fourth electronically controlled switch S4. The voltage across inductor L1 is thus Vin and current Ih increases at a rate Vin/L. In the event that voltage representation VC is greater than error voltage EA offset by high threshold voltage source 460, switching control unit 610 is arranged to: open second electronically controlled switch S2 and third electronically controlled switch S3; and close first electronically controlled switch S1 and fourth electronically controlled switch S4. The voltage across inductor L1 is thus Vin−Vout and current Ih decreases at a rate of (Vout−Vin)/L since input voltage Vin is lower than output voltage Vout.

Fixed frequency circuitry 430 is arranged to drive converter 400 to maintain a fixed frequency. In particular, each time control flip flop SR1 is set, the Q output of first fixed frequency circuitry flip flop D1 is arranged to output a logical high signal and first fixed frequency circuitry electronically controlled switch 550 is closed responsive to the output logical high signal. First fixed frequency circuitry current source 170 is arranged to output a current thereby charging fixed frequency circuitry capacitor CP and increasing output current ΔH. At the rising edge of the output of external clock 480, denoted CLK, the Q output of second fixed frequency circuitry flip flop D2 is arranged to output a logical high signal and second fixed frequency circuitry electronically controlled switch 560 is closed responsive to the output logical high signal. Second fixed frequency circuitry current source 580 is arranged to output a current thereby drawing current from, and discharging, fixed frequency circuitry capacitor CP and reducing output current ΔH. In certain conditions output current ΔH may be negative responsive to second fixed frequency circuitry current source 580.

Output current ΔH of fixed frequency circuitry 430 is arranged to adjust the low, medium and high current thresholds, i.e. VL, VM and VH, respectively, by adjusting the value of the voltage output by low threshold voltage source 450, medium voltage source 455 and high threshold voltage source 460. An increase in ΔH causes an increase in the voltage output by low threshold voltage source 450, medium threshold voltage source 455 and high threshold voltage source 460, thereby increasing the high and low offsets of error voltage EA, and a decrease in ΔH causes a decrease in the voltage output by low threshold voltage source 450, medium threshold voltage source 455 and high threshold voltage source 460, thereby decreasing the offsets of error voltage EA. An increase in the offsets of error voltage EA causes the switching frequency of converter 400 to decrease and a decrease in the offsets of error voltage EA causes the switching frequency of converter 400 to increase. The adjustment of the offsets of error voltage EA drives the switching frequency of converter 400 towards the fixed frequency of external clock 480.

Control circuitry 470 thus provides for fixed frequency hysteretic control of converter 400 with inductor current Ih increasing to high current threshold VH and decreasing to low current threshold VL during each hysteretic current cycle, which is regularly repeated through each of the buck, buck-boost and boost mode.

Figure 2A:
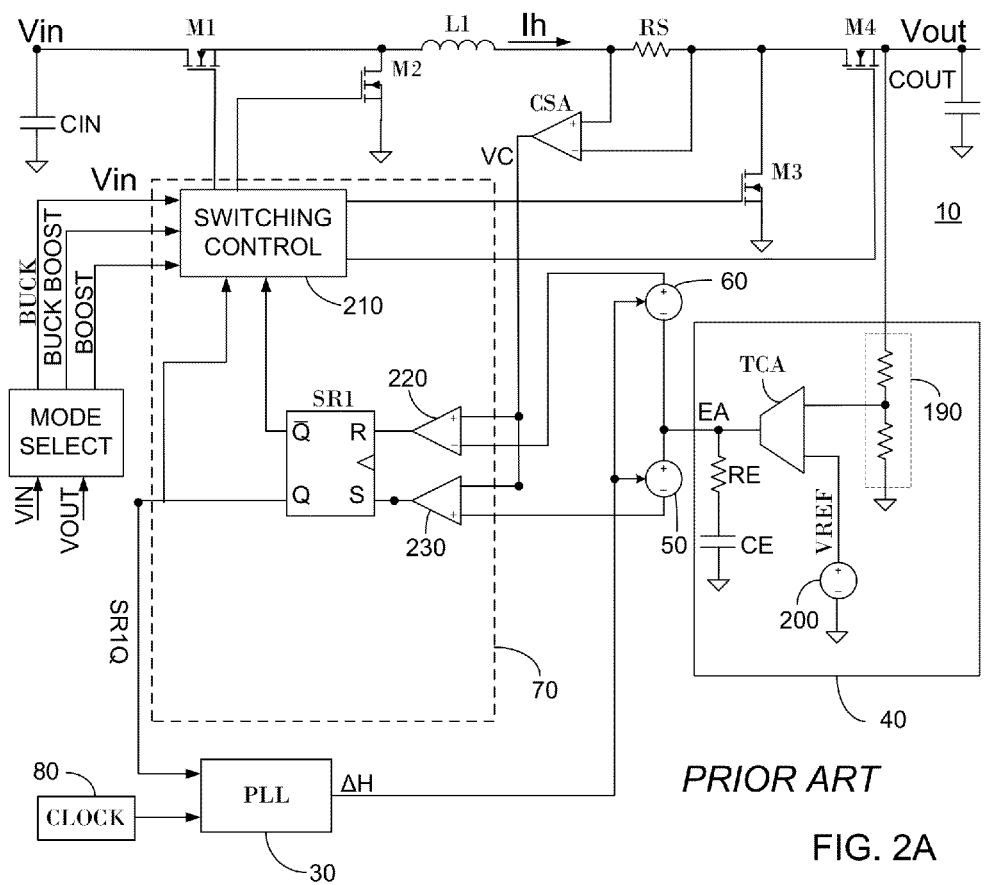
FIG. 2A illustrates a high level schematic diagram of a hysteretic current mode control converter known to the prior art.
Figure 2D:
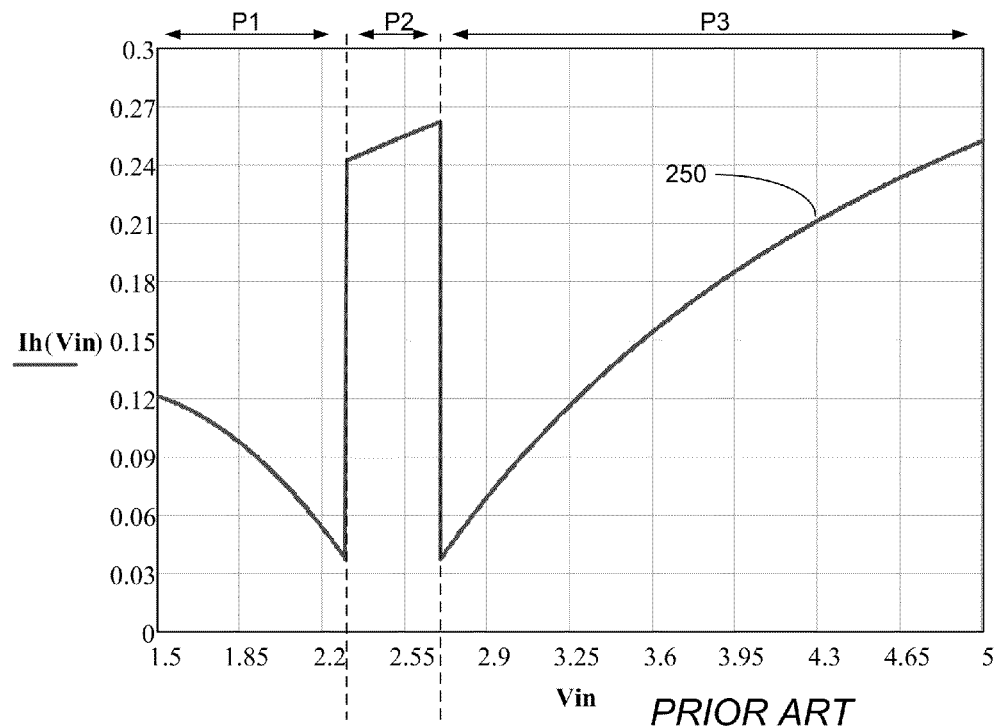
FIG. 2D illustrates a graph of the inductor current of the converter of FIG. 2A in the different stages.
Figure 2E:
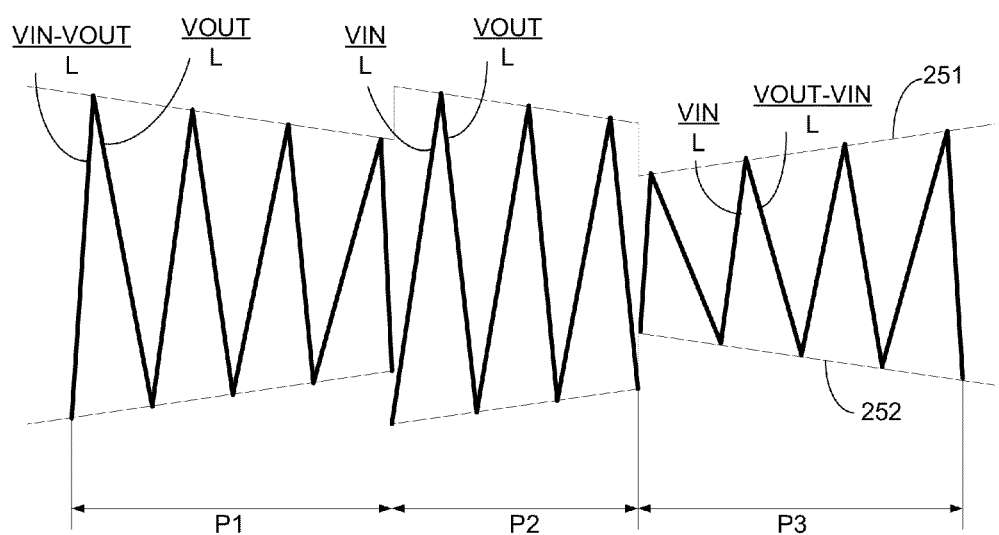
FIG. 2E illustrates a graph of a simplification of the inductor current of the converter of FIG. 2A in the different stages.
Figure 4D:
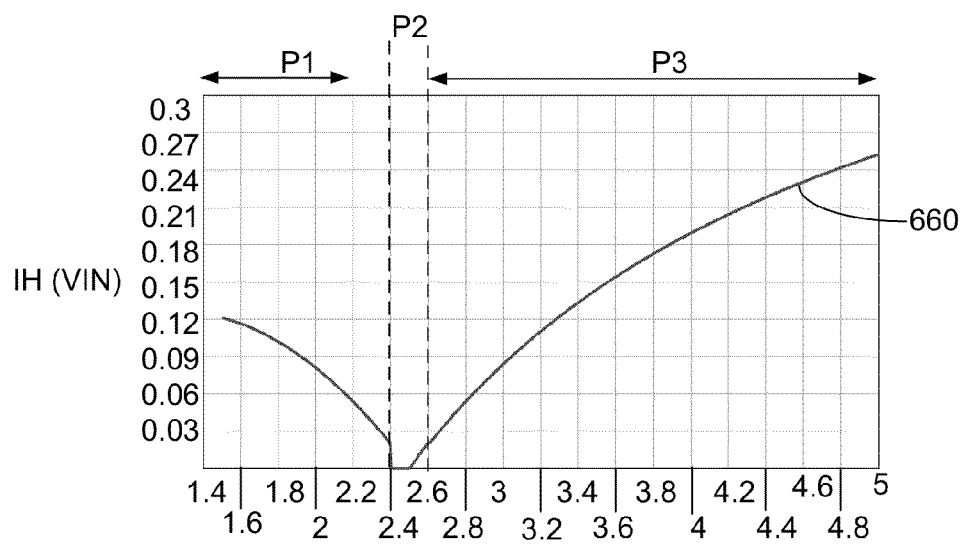
FIG. 4D illustrates a graph of the inductor current of the converter of FIG. 4A in the different stages.

FIG. 4D illustrates a graph of inductor current Ih of converter 400 as a function of input voltage Vin of converter 400, wherein the x-axis represents voltage and the y-axis represents current. As described above, over time input voltage Vin may decrease as illustrated. Converter 400, when Vin is greater than Vout by at least V1, operates in first period P1 in the buck mode. As input voltage Vin continues to decrease converter 400 operates in second period P2, in the buck-boost mode and optionally in the non-switching mode. As input voltage Vin continues to decrease converter 400 operates in third period P3 in the boost mode. As illustrated by curve 660, when converter 400 switches between the buck mode and the buck-boost mode and when converter 400 switches between the non-switching mode and the boost mode there is a discontinuity in inductor current Ih, however it is much smaller than the discontinuity of converter 10 of the prior art illustrated in FIG. 2D. In particular, during the buck mode inductor current Ih is given as:

$$Ih = \frac{1}{Fsw \cdot L} \cdot \left[ Vout \cdot \left(1 - \frac{Vout}{Vin}\right) \right] \quad \text{EQ. 5}$$

during the boost mode inductor current Ih is given as:

$$Ih = \frac{1}{Fsw \cdot L} \cdot \left[ Vin \cdot \left(1 - \frac{Vin}{Vout}\right) \right] \quad \text{EQ. 6}$$

where Fsw is the switching frequency of converter 400, L is the inductance of inductor L1, Vin is the input voltage of converter 400 and Vout is the output voltage of converter 400, as described above in relation to EQs. 2 and 4.

Inductor current Ih in the buck-boost mode is given as:

$$Ih = \frac{1}{Fsw\_sbb \cdot \left[ \frac{L \cdot n}{Vin} + \frac{L \cdot k}{Vin - Vout} + \frac{L \cdot (k+n)}{Vout} \right]} \quad \text{EQ. 7}$$

where Fsw_sbb is the switching frequency of converter 400 during the buck-boost mode, n is the ratio of the time when inductor current Ih rises at a rate of Vin/L to the overall time in which inductor current Ih increases within each hysteretic current cycle and k is the ratio of the time when inductor current Ih rises at a rate of (Vin−Vout)/L to the overall time in which inductor current Ih increases within each hysteretic current cycle. Ratio n is given as:

$$n = \frac{(V_{EA} + V_{PEAK2}) - (V_{EA} + V_{VALLEY})}{(V_{EA} + V_{PEAK2} + V_{PEAK1}) - (V_{EA} + V_{VALLEY})} = \frac{V_{PEAK2} + V_{VALLEY}}{V_{PEAK1} + V_{PEAK2} + V_{VALLEY}} \quad \text{EQ. 8}$$

where $V_{EA}$ is error voltage EA, $V_{PEAK2}$ is the voltage output by medium threshold voltage source 455, $V_{PEAK1}$ is the voltage output by high threshold voltage source 460 and $V_{VALLEY}$ is the voltage output by low threshold voltage source 450. Ratio k is given as:

$$k = \frac{V_{PEAK1}}{V_{PEAK1} + V_{PEAK2} + V_{VALLEY}} \quad \text{Eq. 9}$$

As shown by EQs. 8 and 9, n and k are not affected by the value of error voltage EA.

In one non-limiting embodiment, where Vout is set to be 2.5 V and the first predetermined range of the buck-boost mode is 2.4 V-2.6 V, inductor current Ih is given as:

$$Ih(V_{in}) := \begin{cases} \left[\frac{1}{F_{sw} \cdot L} \cdot \left[V_{out}\left(1 - \frac{V_{out}}{V_{in}}\right)\right]\right] & \text{if } 2.6 \leq V_{in} \leq 5 \\ \dfrac{1}{F_{SW}\left[\dfrac{L \cdot n}{Vin} + \dfrac{L \cdot k}{Vin - Vout} + \dfrac{L \cdot (k+n)}{Vout}\right]} & \text{if } \left[\dfrac{1}{F_{sw}\left[\dfrac{L \cdot n}{Vin} + \dfrac{L \cdot k}{Vin - Vout} + \dfrac{L \cdot (k+n)}{Vout}\right]} > 0\right] \wedge (2.4 \leq V_{in} < 2.6) \\ 0 & \text{if } \left[\dfrac{1}{F_{sw}\left[\dfrac{L \cdot n}{Vin} + \dfrac{L \cdot k}{Vin - Vout} + \dfrac{L \cdot (k+n)}{Vout}\right]} < 0\right] \wedge ((2.4 \leq V_{in} < 2.6)) \\ \left[\dfrac{1}{F_{SW} \cdot L} \cdot \left[V_{in}\left(1 - \dfrac{V_{in}}{V_{out}}\right)\right]\right] & \text{if } 1.5 \leq V_{in} < 2.4 \end{cases}$$

Eq. 10

Figure 4E:
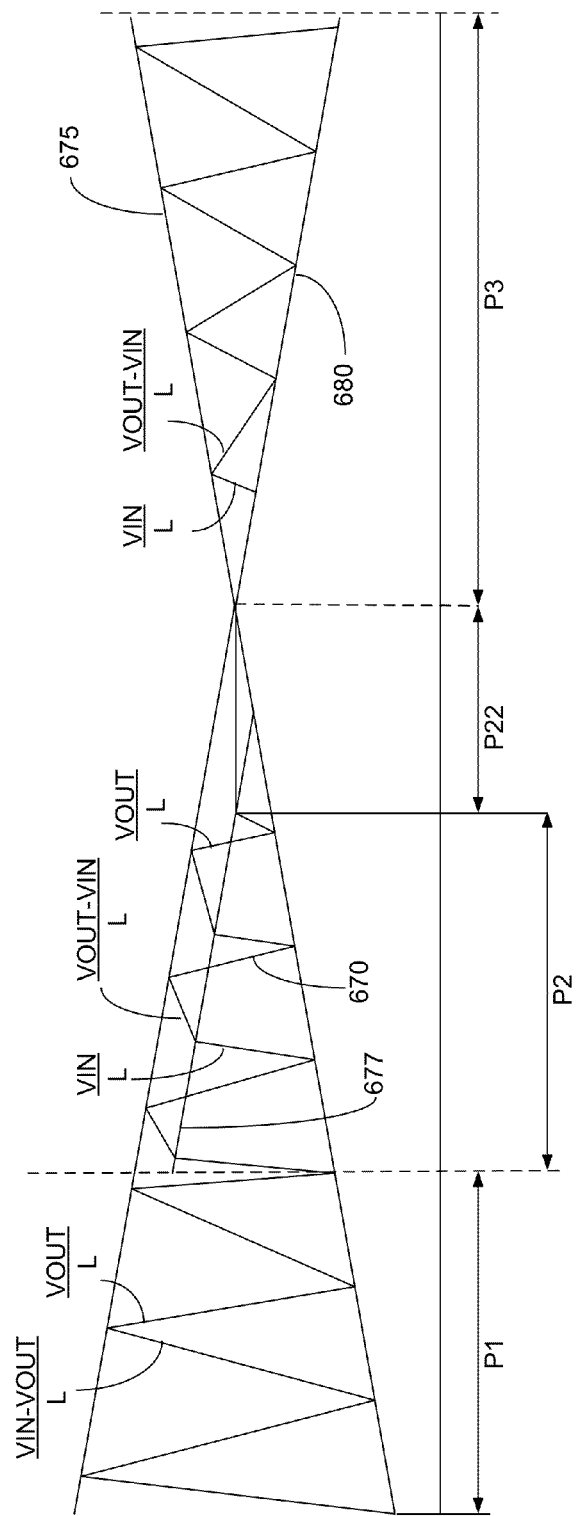
FIG. 4E illustrates a high level graph of the inductor current of the converter of FIG. 4A in the different stages.

FIG. 4E is a simplified illustration of inductor current Ih of converter 400, shown as curve 670, where the x-axis denotes time and the y-axis denotes current. As shown, during period P1, when converter 400 is in the buck mode, inductor current Ih increases at a rate of (Vin−Vout)/L when inductor L1 is coupled between input voltage Vin and output voltage Vout and decreases at a rate of Vout/L when inductor L1 is coupled between output voltage Vout and the common potential. During period P2, when converter 400 is in the buck-boost mode, inductor Ih increases at a rate of Vin/L when inductor L1 is coupled between input voltage Vin and the common potential, increases at a rate of (Vin−Vout)/L when inductor L1 is coupled between input voltage Vin and output voltage Vout and decreases at a rate of Vout/L when inductor L1 is coupled between output voltage Vout and the common potential. During period P22, when converter 400 is in the non-switching mode and the voltage across inductor L1 is substantially zero, inductor current Ih is substantially unchanged except for a decrease responsive to conduction losses in the various elements of converter 400. During period P3, when converter 400 is in the boost mode, inductor current Ih increases at a rate of Vin/L when inductor L1 is coupled between input voltage Vin and the common potential and decreases at a rate of (Vout−Vin)/L when inductor L1 is coupled between input voltage Vin and output voltage Vout. As shown, during the buck mode of converter 400, fixed frequency circuitry 430 decreases the hysteretic offsets of error voltage EA, the offsets shown by lines 675, 677 and 680. As converter 400 switches to the buck-boost mode fixed frequency circuitry 430 continues to decrease the hysteretic offsets of error voltage EA and no substantial discontinuity occurs in inductor current Ih. As converter 400 switches to the non-switching mode inductor current Ih is substantially unchanged. As converter 400 switches to the boost mode fixed frequency circuitry 30 increases the hysteretic offsets of error voltage EA.

FIG. 5 illustrates a high level flow chart of a first method of operation of a hysteretic current mode control converter, such as converter 300 of FIG. 3 and converter 400 of FIGS. 4A-4C. In stage 1000, responsive to the voltage at the input of the converter being within a predetermined range of the voltage at the output of the converter, such as the predetermined ranged defined by buck mode voltage source 500 and boost mode voltage source 520 of mode control circuitry 420 of converter 400, the converter is arranged to operate in a buck-boost mode.

In stage 1010, in the buck-boost mode, responsive to a current flowing through an inductor of the converter, such as inductor current Ih, being lower than a predetermined low current threshold, the inductor is coupled between the input of the converter and a common potential. In one embodiment, as described above in relation to converters 300 and 400, the coupling of the inductor between the input of the converter and the common potential comprises: closing a first electronically controlled switch, a first terminal of the first electronically controlled switch coupled to the input of the converter and a second terminal of the first electronically controlled switch coupled to a first end of the inductor; opening a second electronically controlled switch, a first terminal of the second electronically controlled switch coupled to the first end of the inductor and a second terminal of the second electronically controlled switch coupled to a common potential; closing a third electronically controlled switch, a first terminal of the third electronically controlled switch coupled to a second end of the inductor and a second terminal of the third electronically controlled switch coupled to the common potential; and opening a fourth electronically controlled switch, a first terminal of the fourth electronically controlled switch coupled to the second end of the inductor and a second terminal of the fourth electronically controlled switch coupled to the output of the converter.

In another embodiment, a low threshold voltage is generated and coupled to the output of the converter, such as low threshold voltage source 450 of FIG. 4A. The predetermined low current threshold is a function of the generated low threshold voltage and the voltage at the output of the converter. In one further embodiment, a current is generated responsive to the difference between the voltage at the output of the converter and a reference voltage, such as by transconductance amplifier TCA of FIG. 4A. A capacitor, such as error circuitry capacitor CE of FIG. 4A, is charged responsive to the generated current. The coupling of the generated low threshold voltage to the output of the converter comprises coupling the generated low threshold voltage to the capacitor.

In stage 1020, in the buck-boost mode, responsive to the current flowing through the inductor of the converter being greater than a predetermined medium current threshold, the inductor is coupled between the input of the converter and the output of the converter. The predetermined medium current threshold is greater than the predetermined low current threshold. In one embodiment, the coupling of the inductor between the input of the converter and the output of the converter comprises closing the first and fourth electronically controlled switches of stage 1010 and opening the second and third electronically controlled switches of stage 1010. In another embodiment, a medium threshold voltage is generated and coupled to the output of the converter, such as medium threshold voltage source 455 of FIG. 4A. The predetermined medium current threshold is a function of the generated medium threshold voltage and the voltage at the output of the converter. In one further embodiment, as described above in relation to stage 1010, a current is generated responsive to the difference between the voltage at the output of the converter and a reference voltage, such as by transconductance amplifier TCA of FIG. 4A. A capacitor, such as error circuitry capacitor CE of FIG. 4A, is charged responsive to the generated current. The coupling of the generated medium threshold voltage to the output of the converter comprises coupling the generated medium threshold voltage to the capacitor.

In stage 1030, in the buck-boost mode, responsive to the current flowing through the inductor of the converter being greater than a predetermined high current threshold, the inductor is coupled between the output of the converter and the common potential. The predetermined high current threshold is greater than the predetermined medium current threshold. In one embodiment, the coupling of the inductor between the output of the converter and the common potential comprises closing the second and fourth electronically controlled switches of stage 1010 and opening the first and third electronically controlled switches of stage 1010. In another embodiment, a high threshold voltage is generated and coupled to the output of the converter, such as high threshold voltage source 460 of FIG. 4A. The predetermined high current threshold is a function of the generated high threshold voltage and the voltage at the output of the converter. In one further embodiment, as described above in relation to stage 1010, a current is generated responsive to the difference between the voltage at the output of the converter and a reference voltage, such as by transconductance amplifier TCA of FIG. 4A. A capacitor, such as error circuitry capacitor CE of FIG. 4A, is charged responsive to the generated current. The coupling of the generated high threshold voltage to the output of the converter comprises coupling the generated high threshold voltage to the capacitor.

In optional stage 1040, one of the predetermined low current threshold of stage 1010, the predetermined medium current threshold of stage 1020 and the predetermined high current threshold of stage 1030 is adjusted so as to maintain a fixed switching frequency of the converter. In one embodiment, in the buck-boost mode of the converter, the predetermined medium and high current thresholds are each reduced and the predetermined low current threshold is increased.

In optional stage 1050, in the buck-boost mode of the converter, responsive to the current flowing through the inductor being less than a predetermined non-switching mode threshold, the converter is arranged to operate in a non-switching mode. In the non-switching mode, the inductor of the converter is coupled between the input of the converter and the output of the converter. The inductor remains coupled between the input of the converter and the output of the converter as long as the converter remains in the non-switching mode.

In optional stage 1060, responsive to the voltage at the input of the converter being greater than the voltage at the output of the converter by a first predetermined value, the converter is arranged to operate in a buck mode. In the buck mode: responsive to the current flowing through the inductor of the converter being lower than the predetermined low current threshold of stage 1010, the inductor is coupled between the input of the converter and the output of the converter; and responsive to the current flowing through the inductor of the converter being greater than the predetermined high current threshold of stage 1030, the inductor is coupled between the output of the converter and a common potential. Preferably, the first predetermined value is substantially equal to the upper limit of the predetermined range of stage 1000.

In optional stage 1070, responsive to the voltage at the input of the converter being lower than the voltage at the output of the converter by a second predetermined value, the converter is arranged to operate in a boost mode. In the boost mode: responsive to the current flowing through the inductor of the converter being lower than the predetermined low current threshold of stage 1010, the inductor is coupled between the input of the converter and a common potential; and responsive to the current flowing through the inductor of the converter being greater than the predetermined high current threshold of stage 1030, the inductor is coupled between the input of the converter and the output of the converter.

Figure 6A:
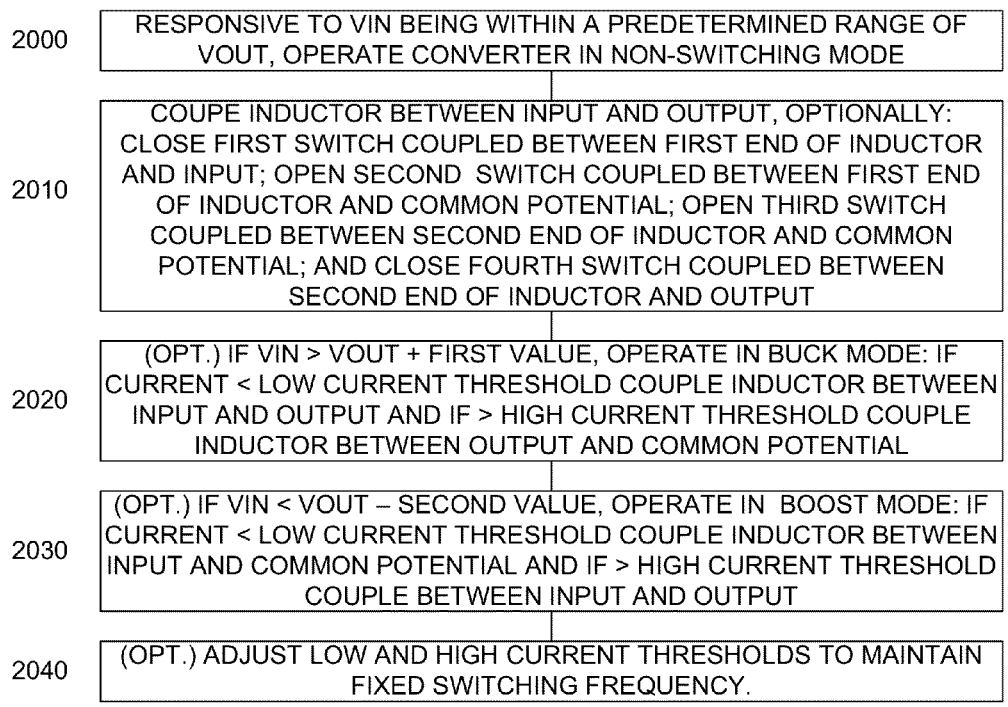
FIG. 6A illustrates a high level flow chart of a second method of controlling a hysteretic current mode control converter.

FIG. 6A illustrates a high level flow chart of a second method of operation of a hysteretic current mode control converter. In one embodiment, the method of FIG. 6A is arranged to operate converter 300 of FIG. 3A. In another embodiment, the method of FIG. 6A is arranged to operate converter 400 of FIGS. 4A-4C. In such an embodiment, second control flip flop SR2, medium threshold voltage source 455, first AND gate 640 and second AND gate 650 of converter 400 are not necessary for the operation.

In stage 2000, responsive to the voltage at the input of the converter being within a predetermined range of the voltage at the output of the converter, such as the predetermined range defined by buck mode voltage source 500 and boost mode voltage source 520 of mode control circuitry 420 of converter 400, the converter is arranged to operate in a non-switching mode.

In stage 2010, in the non-switching mode, the inductor is coupled between the input of the converter and the output of the converter. The coupling of the inductor between the input and the output of the converter is preferably maintained throughout the entire duration of the non-switching mode. In one embodiment, as described above in relation to converters 300 and 400, the coupling of the inductor between the input of the converter and the output of the converter comprises: closing a first electronically controlled switch, a first terminal of the first electronically controlled switch coupled to the input of the converter and a second terminal of the first electronically controlled switch coupled to a first end of the inductor; opening a second electronically controlled switch, a first terminal of the second electronically controlled switch coupled to the first end of the inductor and a second terminal of the second electronically controlled switch coupled to a common potential; opening a third electronically controlled switch, a first terminal of the third electronically controlled switch coupled to a second end of the inductor and a second terminal of the third electronically controlled switch coupled to the common potential; and closing a fourth electronically controlled switch, a first terminal of the fourth electronically controlled switch coupled to the second end of the inductor and a second terminal of the fourth electronically controlled switch coupled to the output of the converter.

In optional stage 2020, responsive to the voltage at the input of the converter being greater than the voltage at the output of the converter by a first predetermined value, such as the predetermined value defined by buck mode voltage source 500 of converter 400, the converter is arranged to operate in a buck mode. In the buck mode, as described above in relation to optional stage 1060: responsive to the current flowing through the inductor of the converter being lower than a predetermined low current threshold, the inductor is coupled between the input of the converter and the output of the converter; and responsive to the current flowing through the inductor of the converter being greater than a predetermined high current threshold, the inductor is coupled between the output of the converter and a common potential.

In optional stage 2030, responsive to the voltage at the input of the converter being lower than the voltage at the output of the converter by a second predetermined value, such as the predetermined value defined by boost mode voltage source 520 of converter 400, the converter is arranged to operate in a boost mode. In the boost mode: responsive to the current flowing through the inductor of the converter being lower than the predetermined low current threshold of optional stage 2020, the inductor is coupled between the input of the converter and a common potential; and responsive to the current flowing through the inductor of the converter being greater than the predetermined high current threshold of optional stage 2020, the inductor is coupled between the input of the converter and the output of the converter.

In optional stage 2040, the predetermined low current threshold and high current threshold of optional stages 2020-2030 are adjusted so as to maintain a fixed switching frequency of the converter. In one embodiment, in the buck mode of the converter, the predetermined high current threshold is reduced and the predetermined low current threshold is increased. In the boost mode of the converter, the predetermined high current threshold is increased and the predetermined low current threshold is reduced.

Figure 6B:
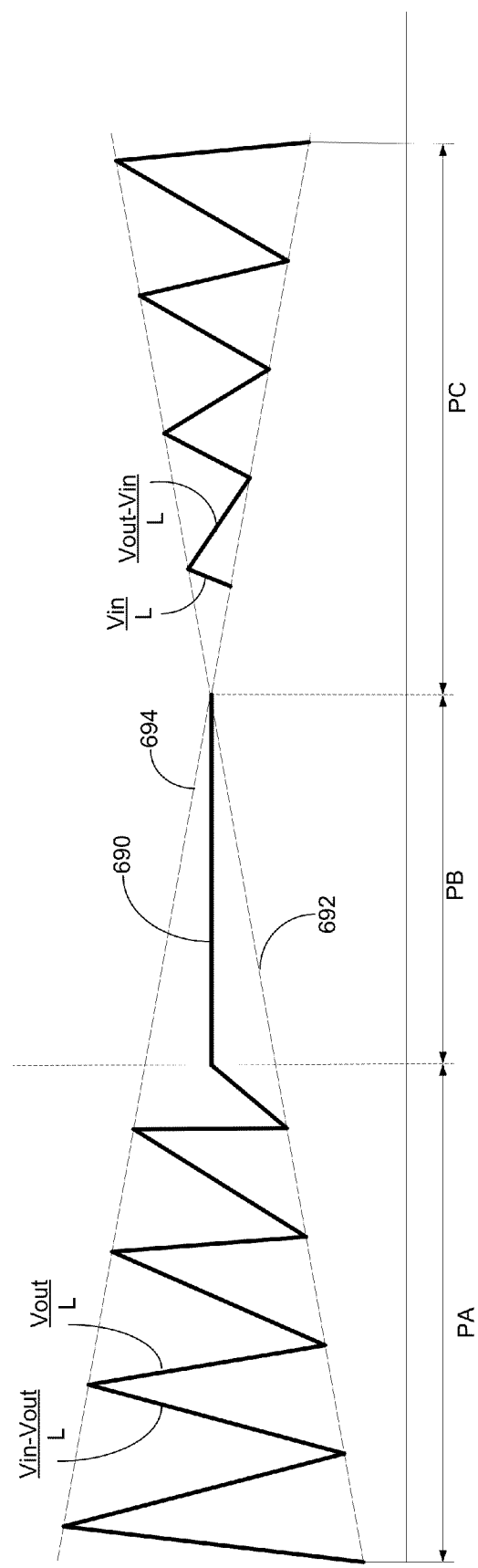
FIG. 6B illustrates a graph of a simplification of the inductor current of a converter operated by the method of FIG. 6A.

FIG. 6B shows a simplified illustration of the inductor current of a hysteretic current mode control converter operated by the method of FIG. 6A, the inductor current shown by curve 690 where the x-axis denotes time and the y-axis denotes current. As shown, during period PA, when the converter is in the buck mode, the inductor current increases at a rate of (Vin−Vout)/L when the inductor is coupled between input voltage Vin and output voltage Vout and decreases at a rate of Vout/L when the inductor is coupled between output voltage Vout and the common potential, where L is the inductance of the inductor. During period PB, when the converter is in the non-switching mode, the inductor current is unchanged. Since the converter is arranged to be in the non-switching mode when input voltage Vin is substantially equal to output voltage Vout and during the non-switching mode the inductor is coupled between input voltage Vin and output voltage Vout, the voltage across the inductor is substantially zero thereby the inductor current doesn't change with the exception of conduction losses in the converter. During period PC, when the converter is in the boost mode, the inductor current increases at a rate of Vin/L when the inductor is coupled between input voltage Vin and the common potential and decreases at a rate of (Vout−Vin)/L when the inductor is coupled between input voltage Vin and output voltage Vout. As shown, during the buck mode of the converter the hysteretic range is reduced, the hysteretic offsets shown by lines 692 and 694. As the converter switches to the non-switching mode the hysteretic range continues to decrease. As the converter switches to the boost mode the hysteretic range increases. As illustrated, the method of FIG. 6B thus reduces the discontinuity in the inductor current.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

Unless otherwise defined, all technical and scientific terms used herein have the same meanings as are commonly understood by one of ordinary skill in the art to which this invention belongs. Although methods similar or equivalent to those described herein can be used in the practice or testing of the present invention, suitable methods are described herein.

All publications, patent applications, patents, and other references mentioned herein are incorporated by reference in their entirety. In case of conflict, the patent specification, including definitions, will prevail. In addition, the materials, methods, and examples are illustrative only and not intended to be limiting.

The terms "include", "comprise" and "have" and their conjugates as used herein mean "including but not necessarily limited to".

It will be appreciated by persons skilled in the art that the present invention is not limited to what has been particularly shown and described hereinabove. Rather the scope of the present invention is defined by the appended claims and includes both combinations and sub-combinations of the various features described hereinabove as well as variations and modifications thereof, which would occur to persons skilled in the art upon reading the foregoing description.

We claim:

1. A hysteretic current mode control converter, comprising:
an inductor;
a first electronically controlled switch, a first terminal of said first electronically controlled switch coupled to an input of the converter and a second terminal of said first electronically controlled switch coupled to a first end of said inductor;
a second electronically controlled switch, a first terminal of said second electronically controlled switch coupled to the first end of said inductor, a second terminal of said second electronically controlled switch coupled to a common potential;
a third electronically controlled switch, a first terminal of said third electronically controlled switch coupled to a second end of said inductor and a second terminal of said third electronically controlled switch coupled to the common potential;
a fourth electronically controlled switch, a first terminal of said fourth electronically controlled switch coupled to the second end of said inductor and a second terminal of said fourth electronically controlled switch coupled to an output of the converter;
an voltage error circuitry coupled to the output of the converter, said voltage error circuitry arranged to output an error signal whose level is responsive to a difference between a voltage at the output of the converter and a reference voltage;
a low threshold voltage source arranged to output the error signal offset by a low voltage threshold;
a medium threshold voltage source arranged to output the error signal offset by a medium voltage threshold;
a high threshold voltage source arranged to output the error signal offset by a high voltage threshold;
a current sense circuit arranged to output a signal representative of an amount of current flowing through said inductor;
a high threshold comparator arranged to compare the signal representative of the amount of current flowing through said inductor with the error signal offset by the high voltage threshold;

a medium threshold comparator arranged to compare the signal representative of the amount of current flowing through said inductor with the error signal offset by the medium voltage threshold;

a low threshold comparator arranged to compare the signal representative of the amount of current flowing through said inductor with the error signal offset by the low voltage threshold; and a switching control unit in communication with a control input of each of said first, second, third and fourth electronically controlled switches, said switching control unit arranged to operate in a buck-boost mode responsive to a voltage at the input of the converter being within a predetermined range of the voltage at the output of the converter, said switching control unit arranged in said buck-boost mode:

responsive to the output of the low threshold comparator indicative that the signal representative of the amount of current flowing through said inductor is less than the error signal offset by the low voltage threshold, to close said first electronically controlled switch and said third electronically controlled switch and open said second electronically controlled switch and said fourth electronically controlled switch;

responsive to the output of the medium threshold comparator indicative that the signal representative of the amount of current flowing through said inductor is greater than the error signal offset by the medium voltage threshold, to close said first electronically controlled switch and said fourth electronically controlled switch and open said second electronically controlled switch and said third electronically controlled switch; and responsive to the output of the high threshold comparator indicative that the signal representative of the amount of current flowing through said inductor is greater than the error signal offset by the high voltage threshold, to close said second electronically controlled switch and said fourth electronically controlled switch and open said first electronically controlled switch and said third electronically controlled switch, wherein said medium voltage threshold is greater than said low voltage threshold, and wherein said high voltage threshold is greater than said medium voltage threshold.

2. The hysteretic current mode control converter of claim 1, further comprising:

a fixed frequency circuitry, an output of said control circuitry coupled to an input of said fixed frequency circuitry, wherein said fixed frequency circuitry is arranged to adjust one of said low threshold voltage source, said medium threshold voltage source and said high threshold voltage source so as to maintain a fixed switching frequency of the hysteretic current mode control converter.

3. The hysteretic current mode control converter of claim 1, wherein said voltage error circuitry comprises:

a transconductance amplifier, a first input of said transconductance amplifier coupled to the output of the converter and a second input of said transconductance amplifier coupled to a reference voltage source, the output of the transconductance amplifier being the output of the voltage error circuitry, wherein a resistor and a capacitor are coupled in series between the output of the transconductance amplifier and a common potential.

4. The hysteretic current mode control converter of claim 1, wherein said switching control unit is further arranged to operate in a non-switching mode responsive to the current flowing through said inductor being lower than a predetermined non-switching mode threshold, wherein said switching control unit is arranged in said non-switching mode to close said first electronically controlled switch and said fourth electronically controlled switch and open said second electronically controlled switch and said third electronically controlled switch.

5. The hysteretic current mode control converter of claim 1, wherein said switching control unit is further arranged to operate in a buck mode responsive to the voltage at the input of the converter being greater than the voltage at the output of the converter by a first predetermined value, said switching control unit arranged in said buck mode:

responsive to the output of the low threshold comparator indicative that the signal representative of the amount of current flowing through said inductor is less than the error signal offset by the low voltage threshold, to close said first electronically controlled switch and said fourth electronically controlled switch and open said second electronically controlled switch and said third electronically controlled switch; and responsive to the output of the high threshold comparator indicative that the signal representative of the amount of current flowing through said inductor is greater than the error signal offset by the high voltage threshold, to close said second electronically controlled switch and said fourth electronically controlled switch and open said first electronically controlled switch and said third electronically controlled switch, and wherein said switching control circuitry switching control unit is further arranged to operate in a boost mode responsive to the voltage at the input of the converter being lower than the voltage at the output of the converter by a second predetermined value, said switching control unit arranged in said boost mode:

responsive to the output of the low threshold comparator indicative that the signal representative of the amount of current flowing through said inductor is less than the error signal offset by the low voltage threshold, to close said first electronically controlled switch and said third electronically controlled switch and open said second electronically controlled switch and said fourth electronically controlled switch; and responsive to the output of the high threshold comparator indicative that the signal representative of the amount of current flowing through said inductor is greater than the error signal offset by the high voltage threshold, to close said first electronically controlled switch and said fourth electronically controlled switch and open said second electronically controlled switch and said third electronically controlled switch.

6. A hysteretic current mode control converter, comprising:

an inductive means for energy transfer;

a switching means arranged to alternately couple said inductive means for energy transfer between an input of the converter and an output of the converter, between the input of the converter and a common potential and between the output of the converter and the common potential;

an voltage error means coupled to the output of the converter, said voltage error means arranged to output an error signal whose level is responsive to a difference between a voltage at the output of the converter and a reference voltage;

a low threshold voltage means arranged to output the error signal offset by a low voltage threshold;

a medium threshold voltage means arranged to output the error signal offset by a medium voltage threshold;

a high threshold voltage means arranged to output the error signal offset by a high voltage threshold;

a current sense means arranged to output a signal representative of an amount of current flowing through said inductive means;

a high threshold comparing means arranged to compare the signal representative of the amount of current flowing through said inductive means with the error signal offset by the high voltage threshold;

a medium threshold comparing means arranged to compare the signal representative of the amount of current flowing through said inductive means with the error signal offset by the medium voltage threshold;

a low threshold comparing means arranged to compare the signal representative of the amount of current flowing through said inductive means with the error signal offset by the low voltage threshold; and a switching control unit in communication with a control input of said switching means, said switching control unit arranged to operate in a buck-boost mode responsive to a voltage at the input of the converter being within a first predetermined range of the voltage at the output of the converter, said switching control unit arranged in said buck-boost mode:

responsive to the output of the low threshold comparing means indicative that the signal representative of the amount of current flowing through said inductive means is less than the error signal offset by the low voltage threshold, to control said switching means to couple said inductive means for energy transfer between the input of the converter and the common potential;

responsive to the output of the medium threshold comparing means indicative that the signal representative of the amount of current flowing through said inductive means is greater than the error signal offset by the medium voltage threshold, to control said switching means to couple said inductive means for energy transfer between the input of the converter and the output of the converter; and responsive to the output of the high threshold comparing means indicative that the signal representative of the amount of current flowing through said inductive means is greater than the error signal offset by the high voltage threshold, to control said switching means to couple said inductive means for energy transfer between the output of the converter and the common potential, wherein said medium voltage threshold is greater than said low voltage threshold, and wherein said high voltage threshold is greater than said medium voltage threshold.

7. The hysteretic current mode control converter of claim 6, further comprising:

a fixed frequency circuitry, an output of said control circuitry coupled to an input of said fixed frequency circuitry, wherein said fixed frequency circuitry is arranged to adjust one of said low threshold voltage means, said medium threshold voltage means and said high threshold voltage means so as to maintain a fixed switching frequency of the hysteretic current mode control converter.

8. The hysteretic current mode control converter of claim 6, wherein said voltage error circuitry comprises:

a current generating means responsive to the difference between a voltage coupled to a first input of said current generating means and a voltage coupled to a second input of said current generating means, the first input of said current generating means coupled to the output of the converter and the second input of said current generating means coupled to a reference voltage, the output of the current generating means being the output of the voltage error means, wherein a resistor and a capacitor are coupled in series between the output of the current generating means and a common potential.

9. The hysteresis hysteretic current mode control converter of claim 6, wherein said switching control unit is further arranged to operate in a non-switching mode responsive to the current flowing through said inductive means for energy transfer being lower than a predetermined non-switching mode threshold, wherein said switching control unit is arranged in said non-switching mode to control said switching means to couple said inductive means for energy transfer between the input of the converter and the output of the converter.

10. The hysteretic current mode control converter of claim 6, wherein said switching control unit is further arranged to operate in a buck mode responsive to the voltage at the input of the converter being greater than the voltage at the output of the converter by a first predetermined value, said switching control unit arranged in said buck mode:

responsive to the output of the low threshold comparing means indicative that the signal representative of the amount of current flowing through said inductive means is less than the error signal offset by the low voltage threshold, to control said switching means to couple said inductive means for energy transfer between the input of the converter and the output of the converter; and responsive to the output of the high threshold comparing means indicative that the signal representative of the amount of current flowing through said inductive means is greater than the error signal offset by the high voltage threshold, to control said switching means to couple said inductive means for energy transfer between the output of the converter and the common potential, and wherein said switching control unit is further arranged to operate in a boost mode responsive to the voltage at the input of the converter being lower than the voltage at the output of the converter by a second predetermined value, said switching control unit arranged in said boost mode:

responsive to the output of the low threshold comparing means indicative that the signal representative of the amount of current flowing through said inductive means is less than the error signal offset by the low voltage threshold, to control said switching means to couple said inductive means for energy transfer between the input of the converter and the common potential; and responsive to the output of the high threshold comparing means indicative that the signal representative of the amount of current flowing through said inductive means is greater than the error signal offset by the high voltage threshold, to control said switching means to couple said inductive means for energy transfer between the input of the converter and the output of the converter.

* * * * *